(12) United States Patent
Yoshizawa et al.

(10) Patent No.: US 9,366,941 B2
(45) Date of Patent: Jun. 14, 2016

(54) LIGHT AMOUNT ADJUSTMENT DEVICE, OPTICAL DEVICE, AND IMAGE CAPTURING APPARATUS

(71) Applicant: CANON DENSHI KABUSHIKI KAISHA, Chichibu-shi (JP)

(72) Inventors: Takahito Yoshizawa, Kawaguchi (JP); Kyousuke Miyashita, Tokyo (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 0 days.

(21) Appl. No.: 14/823,182

(22) Filed: Aug. 11, 2015

(65) Prior Publication Data

US 2015/0346583 A1 Dec. 3, 2015

Related U.S. Application Data

(63) Continuation of application No. PCT/JP2014/001274, filed on Mar. 7, 2014.

(30) Foreign Application Priority Data

Mar. 8, 2013 (JP) .................................. 2013-046830
May 7, 2013 (JP) .................................. 2013-097973

(51) Int. Cl.
*G03B 9/06* (2006.01)
*G03B 9/14* (2006.01)

(52) U.S. Cl.
CPC ... *G03B 9/06* (2013.01); *G03B 9/14* (2013.01)

(58) Field of Classification Search
CPC .......................................................... G03B 9/06
See application file for complete search history.

(56) References Cited

U.S. PATENT DOCUMENTS

| 7,922,404 | B2 | 4/2011 | Hattori et al. |
| 9,007,671 | B2 | 4/2015 | Yoshizawa et al. |
| 9,152,013 | B2 | 10/2015 | Yoshizawa |
| 2009/0097136 | A1* | 4/2009 | Otsu .................. G03B 9/00 359/739 |
| 2010/0158507 | A1 | 6/2010 | Hattori et al. |
| 2013/0170009 | A1* | 7/2013 | Yoshizawa ......... G03B 7/085 359/230 |
| 2015/0160533 | A1 | 6/2015 | Yoshizawa |

FOREIGN PATENT DOCUMENTS

| JP | 05-011306 A | 1/1993 |
| JP | 2010-145706 A | 7/2010 |
| JP | 2010-204693 A | 9/2010 |

(Continued)

OTHER PUBLICATIONS

Jun. 10, 2014 International Search Report in International Patent Appln. No. PCT/JP2014/001274.

*Primary Examiner* — Clayton E Laballe
*Assistant Examiner* — Noam Reisner
(74) *Attorney, Agent, or Firm* — Fitzpatrick, Cella, Harper & Scinto

(57) ABSTRACT

A device according to the present invention includes at least one first light amount adjustment blade moving rectilinearly in a direction crossing a light passage direction and at least one second light amount adjustment blade pivoting within a plane crossing the light passage direction. When a light passage aperture of a polygonal shape formed by annularly superposing the first light amount adjustment blade and the second light amount adjustment blade is enlarged, a shape of the light passage aperture comes close to a circular shape from a polygonal shape.

10 Claims, 11 Drawing Sheets

(56) References Cited

FOREIGN PATENT DOCUMENTS

| JP | 2011-197082 A | 10/2011 |
| JP | 2012-078556 A | 4/2012 |
| JP | 2012-220761 A | 11/2012 |
| WO | 2012/026104 A1 | 3/2012 |

* cited by examiner

F I G. 2
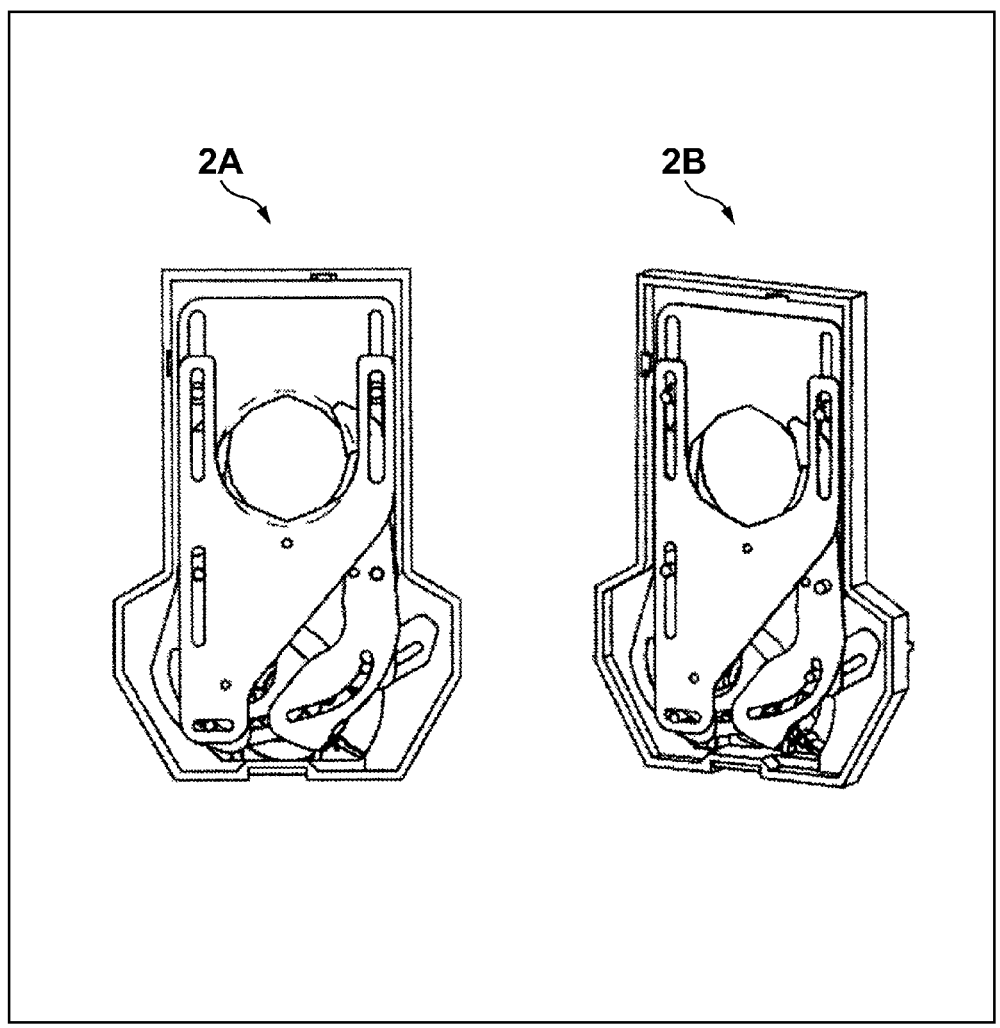

F I G. 8
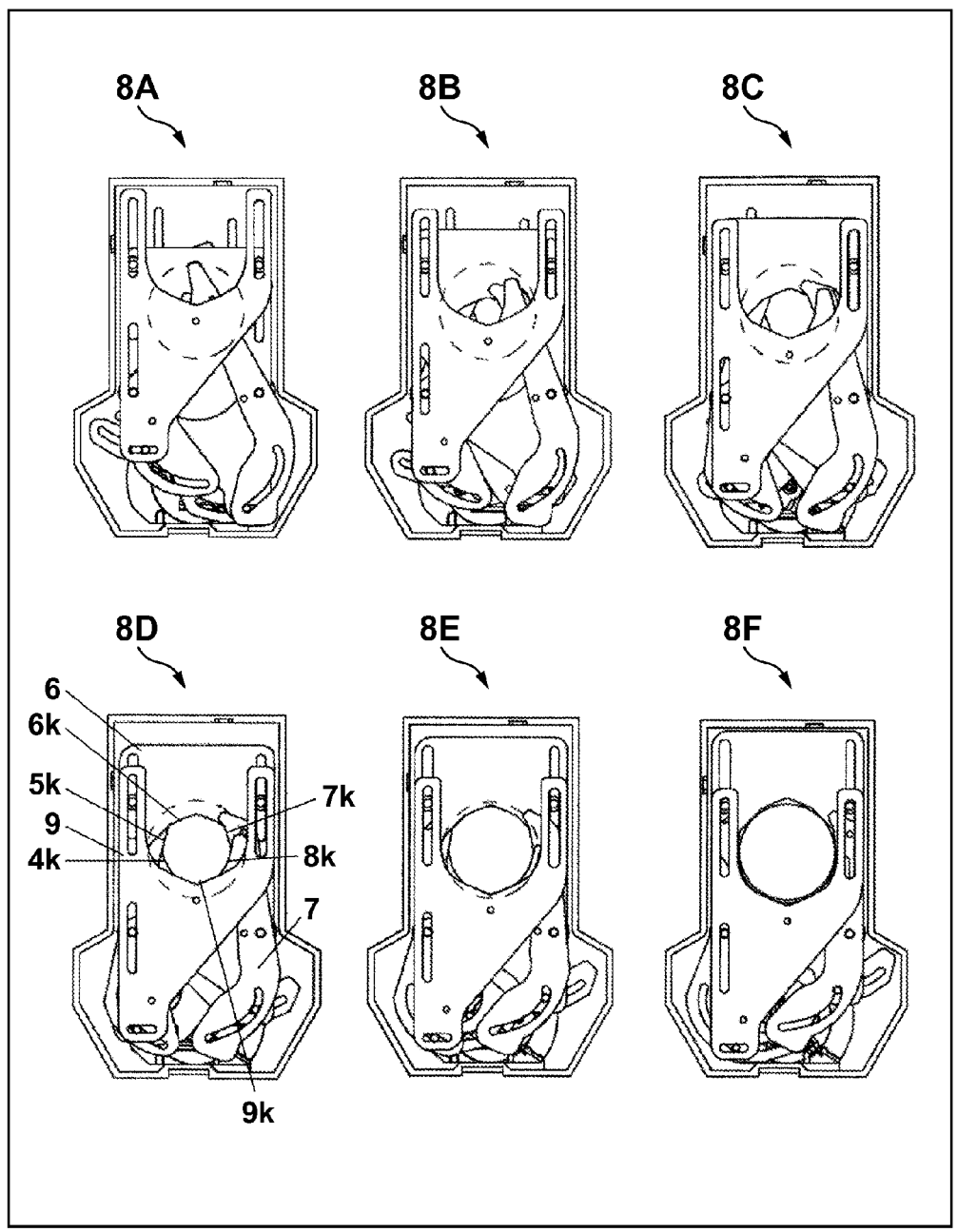

LIGHT AMOUNT ADJUSTMENT DEVICE, OPTICAL DEVICE, AND IMAGE CAPTURING APPARATUS

This application is a continuation of International Patent Application No. PCT/JP2014/001274 filed on Mar. 7, 2014, and claims priority to Japanese Patent Application Nos. 2013-046830 filed on Mar. 8, 2013, and 2013-097973 filed on May 7, 2013, the entire contents of which are incorporated herein by reference.

BACKGROUND OF THE INVENTION

1. Field of the Invention

The present invention relates to a light amount adjustment device that is mounted in an optical device such as a camera or an interchangeable lens, and is also called a diaphragm device or the like.

2. Description of the Related Art

The performance of a light amount adjustment device (diaphragm device) as described above influences the quality of an image captured using an optical device. In particular, the shape of a diaphragm aperture (diaphragm aperture shape) which is formed by aperture blades and through which light actually passes changes the shape of a so-called blur or ghost. More specifically, when the diaphragm aperture shape is close to a circular shape, the shape of the blur or ghost also becomes circular and a high image quality is obtained. However, if the diaphragm aperture shape is a rectangular shape or flat shape greatly different from the circular shape, a blur or ghost appears with a similar shape and the image quality becomes poor.

A diaphragm aperture shape greatly different from the circular shape is readily generated when the diaphragm aperture is formed by two aperture blades that move linearly. To solve this, Japanese Patent Laid-Open No. 2012-78556 discloses a diaphragm device in which the diaphragm aperture is enlarged using four aperture blades that move linearly, and the number of corners of the aperture shape increases from that of a rectangular aperture shape, forming a polygonal diaphragm aperture shape closer to the circular shape than the rectangular shape.

In a light amount adjustment device using an iris diaphragm, which is known in Japanese Patent Laid-Open No. 2010-204693, a spacer is interposed between rectilinear aperture blades and swing aperture blades to prevent interference between the rectilinear aperture blades and the swing aperture blades and prevent inhibition of a smooth swing of the swing aperture blades.

However, in the arrangement of the diaphragm device disclosed in Japanese Patent Laid-Open No. 2012-78556, the shape of a light passage aperture is decided by only aperture blades that move linearly, so it is very difficult to form the light passage aperture into a desired aperture shape.

A light amount adjustment device using an iris diaphragm, like the device in Japanese Patent Laid-Open No. 2010-204693, uses a plurality of aperture blades, and it is very difficult to keep the moving postures of the respective aperture blades.

SUMMARY OF THE INVENTION

The present invention provides a light amount adjustment device capable of forming a light passage aperture into a desired shape, and an optical device including this.

According to an aspect of the present invention, there is provided a light amount adjustment device comprising at least one first light amount adjustment blade configured to move rectilinearly in a direction crossing a light passage direction, and at least one second light amount adjustment blade configured to pivot within a plane crossing the light passage direction, wherein when a light passage aperture of a polygonal shape formed by annularly superposing the first light amount adjustment blade and the second light amount adjustment blade is enlarged, a shape of the light passage aperture comes close to a circular shape from a polygonal shape.

According to another aspect of the present invention, there is provided an optical device comprising the light amount adjustment device.

Further features of the present invention will become apparent from the following description of exemplary embodiments (with reference to the attached drawings).

BRIEF DESCRIPTION OF THE DRAWINGS

FIG. 2 is a perspective view showing the diaphragm device according to the first embodiment;

FIG. 8 is a front view showing a diaphragm aperture shape formed by the diaphragm device according to the first embodiment;

DESCRIPTION OF THE EMBODIMENTS

Embodiments according to the present invention will now be described with reference to the accompanying drawings.

(First Embodiment)

Figure 1:
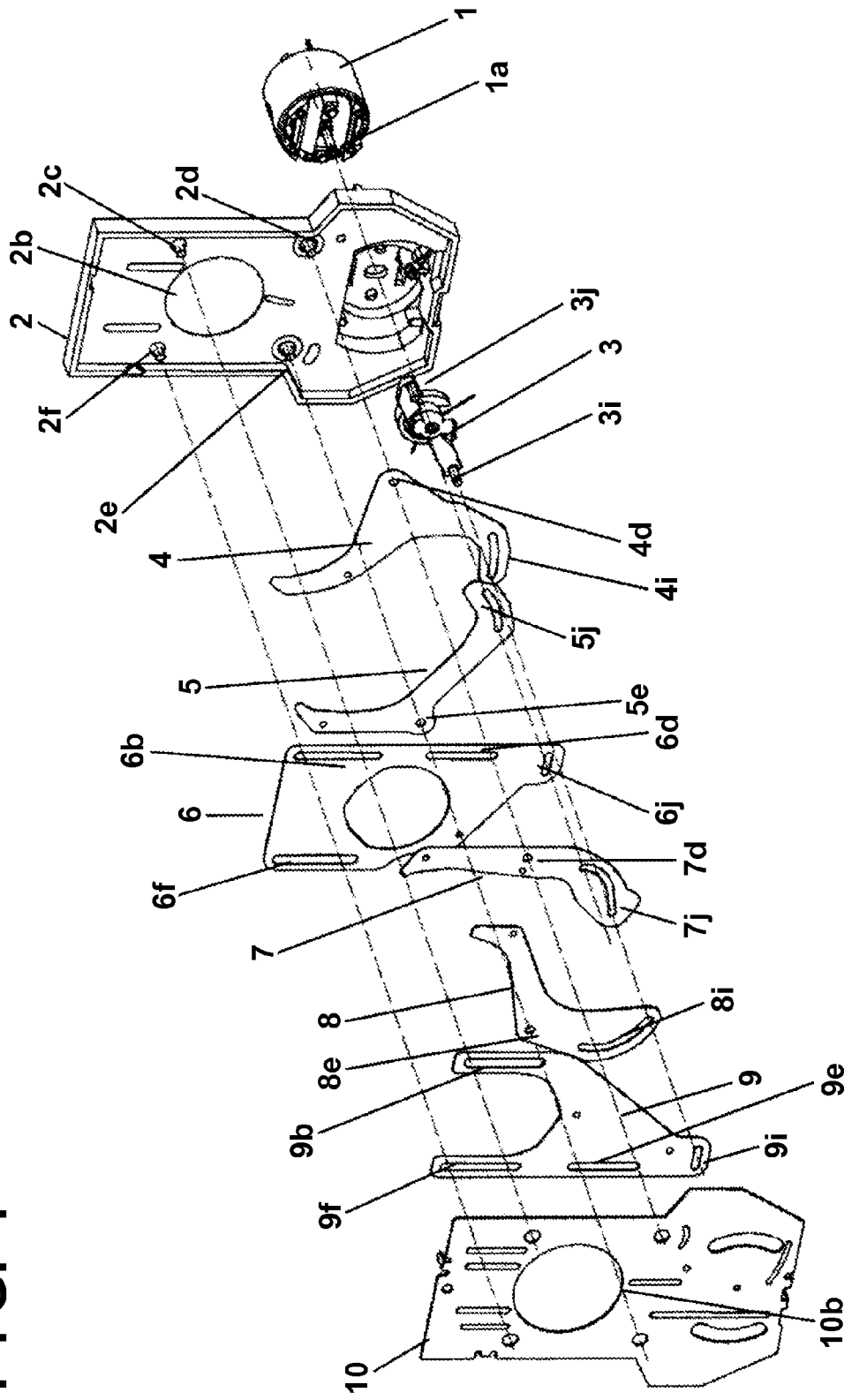
FIG. 1 is an exploded perspective view showing a diaphragm device according to the first embodiment of the present invention.

FIG. 1 is an exploded view showing a diaphragm device serving as a light amount adjustment device according to the first embodiment of the present invention. Also, 2A in FIG. 2 and FIGS. 6 to 8 show the diaphragm device when viewed from a direction (optical axis direction) in which light passes through a diaphragm aperture formed by aperture blades 4 to 9 serving as light amount adjustment blades. Note that FIG. 2 shows a state in which a cover plate 10 shown in FIG. 1 is removed. Further, 2B in FIG. 2 shows the diaphragm device shown in 2A of FIG. 2 when viewed obliquely. In these drawings, the longitudinal direction, which is the top-and-bottom direction, of the diaphragm device is equivalent to a "direction in which the aperture blade moves linearly in a direction crossing a light passage direction", and will be called an optical axis cross direction in the following description. The right-and-left direction of the diaphragm device in these drawings will be called a widthwise direction.

In these drawings, the aperture blades 4 to 9 are accommodated in a housing constituting the sheath of the diaphragm device. A fixed opening 2b through which light passes is formed in a base plate 2 serving as a base member constituting part of the housing. The base plate 2 is fabricated by press working, resin molding, or the like. Shafts 2c, 2d, 2e, and 2f are formed on one surface side of the base plate 2. The shaft 2d functions as the guide pin of the linear aperture blade 6, and the rotation center shaft of the rotating aperture blade 4 and 7. The shaft 2e functions as the guide pin of the linear aperture blade 9, and the rotation center shaft of the rotating aperture blades 5 and 8.

A diaphragm driving unit 1 is attached at a position spaced apart downward from the fixed opening 2b on the other surface (one surface in the optical axis direction) of the base plate 2 serving as an outer surface. The diaphragm driving unit 1 is, for example, an electromagnetic driving motor that is constituted by a rotor magnet (not shown), an output shaft 1a that rotates together with the rotor magnet, and a coil (not shown) that is energized to generate a magnetic force for rotating the rotor magnet. The diaphragm driving unit 1 may be a stepping motor.

The output shaft 1a of the diaphragm driving unit 1 extends through the base plate 2 and projects on the inner surface side of the base plate 2. A driving arm 3 serving as a driving lever is attached to the output shaft 1a by press fitting. The driving arm 3 pivots within a predetermined angle range together with the output shaft 1a around a shaft positioned apart downward from the fixed opening 2b. The driving arm 3 is fabricated by resin molding or the like. Note that the output shaft 1a and the driving arm 3 can also be integrally formed.

The driving arm 3 includes, at a tip on two sides with respect to the position of the output shaft 1a, blade driving pins 3i and 3j serving as transfer units for driving the aperture blades 4 to 9. The blade driving pin 3i is engaged with the three aperture blades, that is, the rotating aperture blade 4, the rotating aperture blade 8, and the linear aperture blade 9. The blade driving pin 3j is engaged with the three aperture blades, that is, the linear aperture blade 6, the rotating aperture blade 5, and the rotating aperture blade 7.

Note that the diaphragm driving unit 1 and the driving arm 3 may be arranged on the outer surface side of the base plate 2, and the blade driving pins 3i and 3j formed on the driving arm 3 may extend through the base plate 2 and project on the inner surface side of the base plate 2.

According to this embodiment, the two blade driving pins 3i and 3j are provided on one driving arm 3 directly attached to (or formed integrally with) the output shaft 1a of the diaphragm driving unit 1. One linear aperture blade (first aperture blade) 9 and the two rotating aperture blades (second aperture blades) 4 and 8 are engaged with the same (common) blade driving pin 3i. Also, one linear aperture blade (first aperture blade) 6 and the two rotating aperture blades (second aperture blades) 5 and 7 are engaged with the other same (common) blade driving pin 3j. The driving arm 3 on which the three aperture blades are engaged with each of the plurality of (two) blade driving pins 3i and 3j is pivoted to move the two linear aperture blades 6 and 9 in the optical axis cross directions, and rotate the four rotating aperture blades 4, 5, 7, and 8. By the six aperture blades 4 to 9, a diaphragm aperture of a polygonal shape close to the circular shape is formed, and its size (diameter) is changed.

Figure 3:
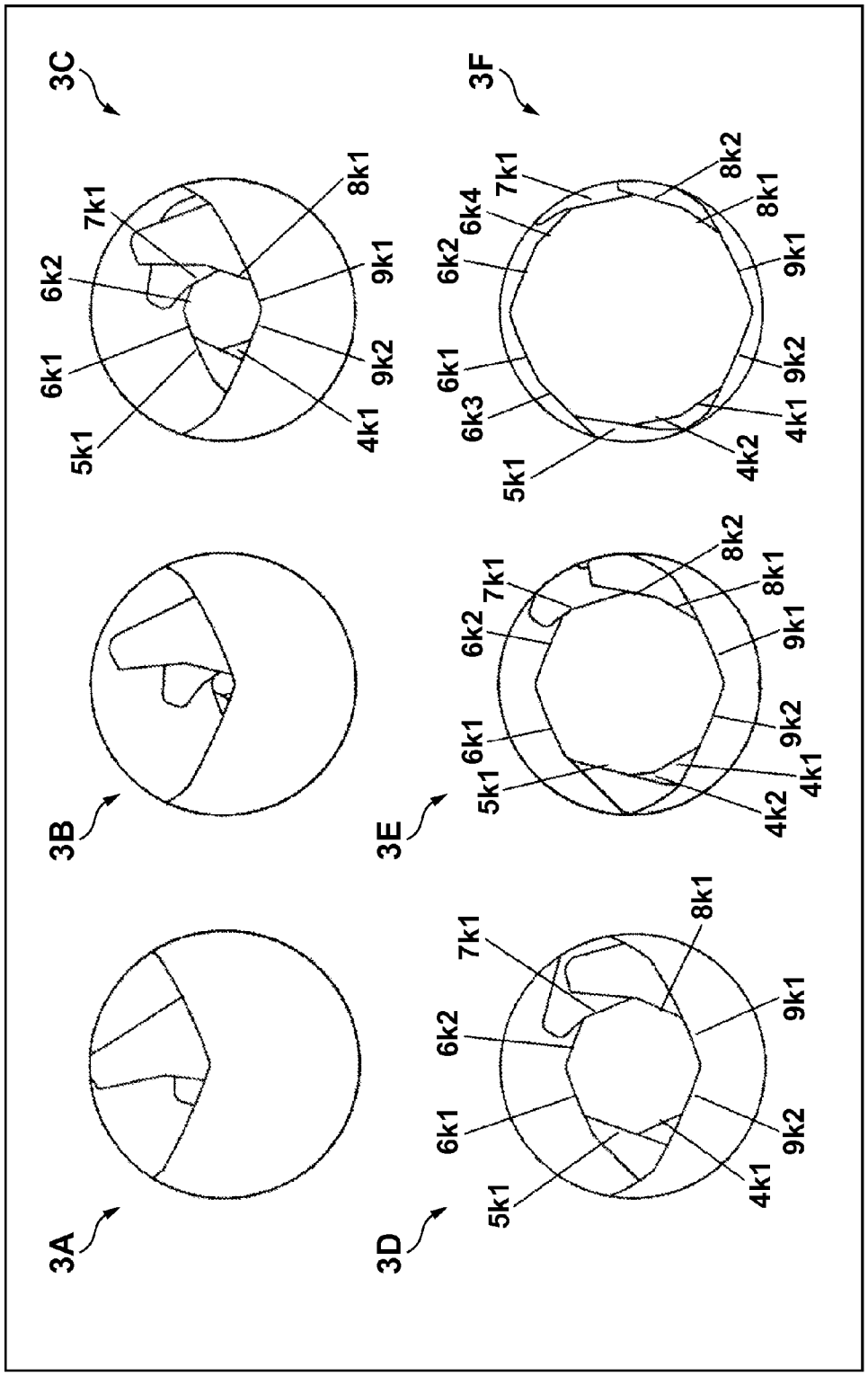
FIG. 3 is a front view showing a diaphragm aperture according to the first embodiment.

In FIG. 3, 3A shows a state in which the diaphragm aperture is fully closed, 3B shows a small-aperture state, 3C and 3D show states in which the diaphragm aperture has almost the octagonal shape and the size is different, 3E shows a state in which the diaphragm aperture has almost the decagonal shape, and 3F shows a state in which the diaphragm aperture has almost the dodecagonal shape.

As shown in 3A to 3F of FIGS. 3 and 8A to 8F of FIG. 8, the shape of the light passage aperture comes close to the circular shape from the polygonal shape by greatly enlarging a light passage aperture formed by annularly superposing the linear aperture blades (first light amount adjustment blades) 6 and 9 that move rectilinearly in directions crossing the light passage direction, and the rotating aperture blades (second light amount adjustment blades) 4, 5, 7, and 8 that pivot within a plane crossing the light passage direction. The linear aperture blades 6 and 9 form the rough size and shape of the diaphragm aperture, and the rotating aperture blades 4, 5, 7, and 8 form the diaphragm aperture on two sides in directions crossing the moving directions of the linear aperture blades 6 and 9. Even in the case of a diaphragm aperture having a large diameter close to the diameter of the fixed opening 2b, a desired aperture shape can be formed. More specifically, the pivoting operation of the rotating aperture blades 4, 5, 7, and 8 is applied in addition to the rectilinear operation of the linear aperture blades 6 and 9. In the course of opening/closing the diaphragm aperture, a desired diaphragm aperture shape can be implemented even in a small movable range. As the diaphragm aperture is enlarged, the shape of the diaphragm aperture can come close to the circular shape from the polygonal shape. Especially in this embodiment, as the linear aperture blades 6 and 9 move rectilinearly in directions in which the light passage aperture is enlarged, the rotating aperture blades 4, 5, 7, and 8 are pivoted respectively. As a result, the shape of the light passage aperture can quickly come close to the circular shape from the polygonal shape. By forming the aperture shape by the linear aperture blades 6 and 9 and the rotating aperture blades 4, 5, 7, and 8, the number of sides of the diaphragm aperture can be increased with small moving amounts of the aperture blades 4 to 9, and the aperture shape can come close to the circular shape from the polygonal shape. Further, since this embodiment adopts both the rectilinear operation of the linear aperture blades 6 and 9 and the pivoting operation of the rotating aperture blades 4, 5, 7, and 8, the rectilinear operation of the linear aperture blades 6 and 9 can be reduced. That is, by adopting the pivoting operation of the rotating aperture blades 4, 5, 7, and 8, the movable range of the linear aperture blades 6 and 9 can be narrowed to reduce the retraction space (accommodation space) of the linear aperture blades 6 and 9, and the diaphragm device can be downsized. In other words, the diaphragm device according to this embodiment can implement a high-performance light amount adjustment structure because the diaphragm device is very advantageous in downsizing of the device, a desired aperture shape can be formed easily in the course of opening/closing the diaphragm aperture, and the shape of the diaphragm aperture can quickly come close to the circular shape from the polygonal shape, compared to a structure in which the light passage aperture is formed by only blades that move rectilinearly.

By employing the above-described arrangement, the diaphragm device can form a diaphragm aperture having a desired shape while the diaphragm device is advantageous in downsizing, compared to a case in which a driving ring (annular plate) arranged around the diaphragm aperture is rotated and different driving shaft portions on the driving ring drive linear aperture blades and rotating aperture blades.

Note that rectilinear movement of the linear aperture blades 6 and 9 in the optical axis cross directions includes not only a case in which the linear aperture blades 6 and 9 move linearly (translate) in the optical axis cross directions, but also a case in which the linear aperture blades 6 and 9 move in the optical axis cross directions while they swing and shift in the widthwise direction.

The cover plate 10 is a cover plate that is attached to the base plate 2 so that a space where the aperture blades 4 to 9 move is formed between the cover plate 10 and the base plate 2. The case member 10 has an opening 10b corresponding to an opening portion 2b formed in the base plate 2. The cover plate 10 is fabricated by press working, resin molding, or the like. Rails (for example, projecting portions different in height) for reducing the sliding resistance with the aperture blades 4 to 9 are formed on the inner surface (surface on the base plate side) of the cover plate 10.

The diaphragm device according to this embodiment can change the diaphragm aperture diameter by pivoting the driving arm 3, as described above, and can completely close (fully close) the diaphragm aperture. Thus, the diaphragm device according to this embodiment can perform even a shutter operation. That is, the diaphragm device according to this embodiment can be used as a diaphragm shutter apparatus.

Figure 4:
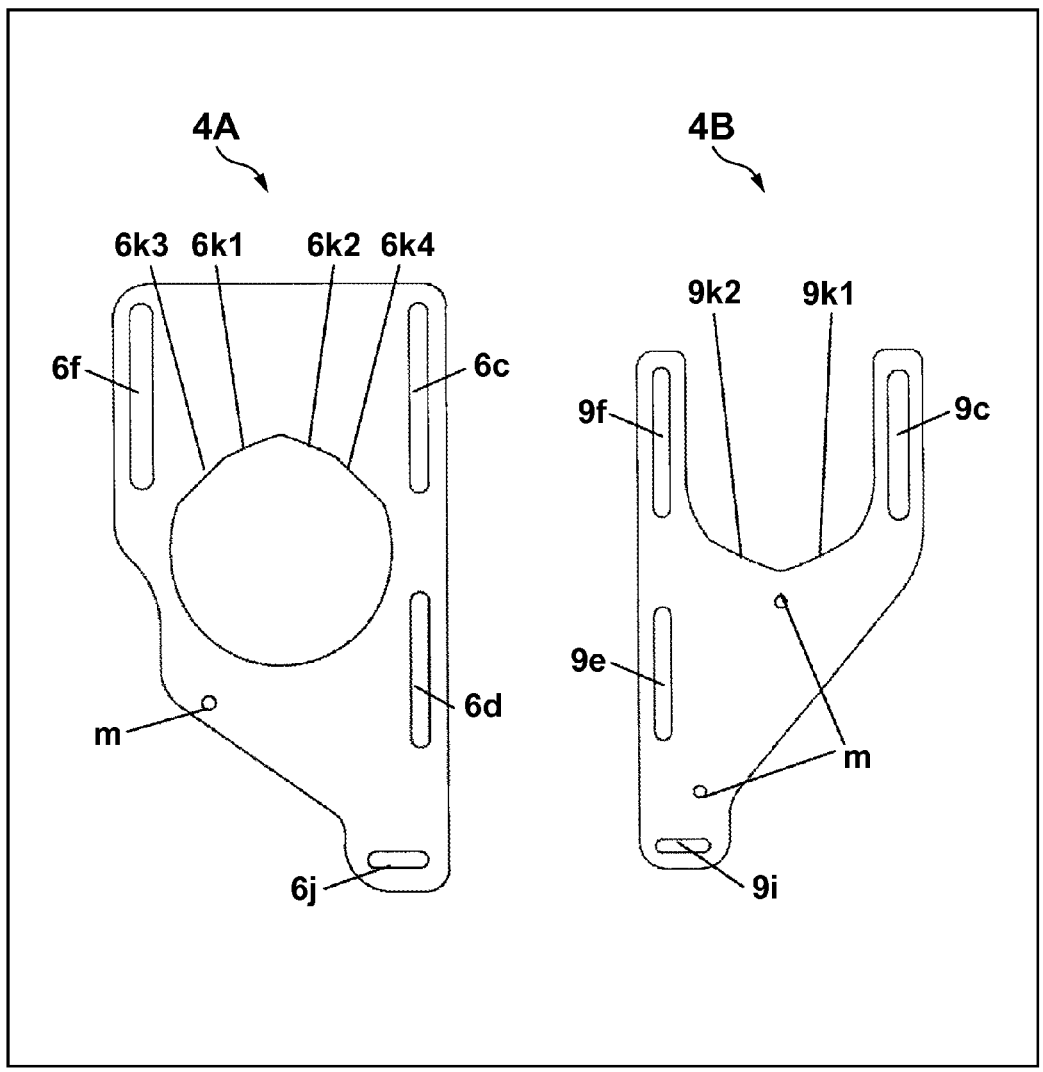
FIG. 4 is a front view showing the first aperture blade according to the first embodiment.
Figure 5:
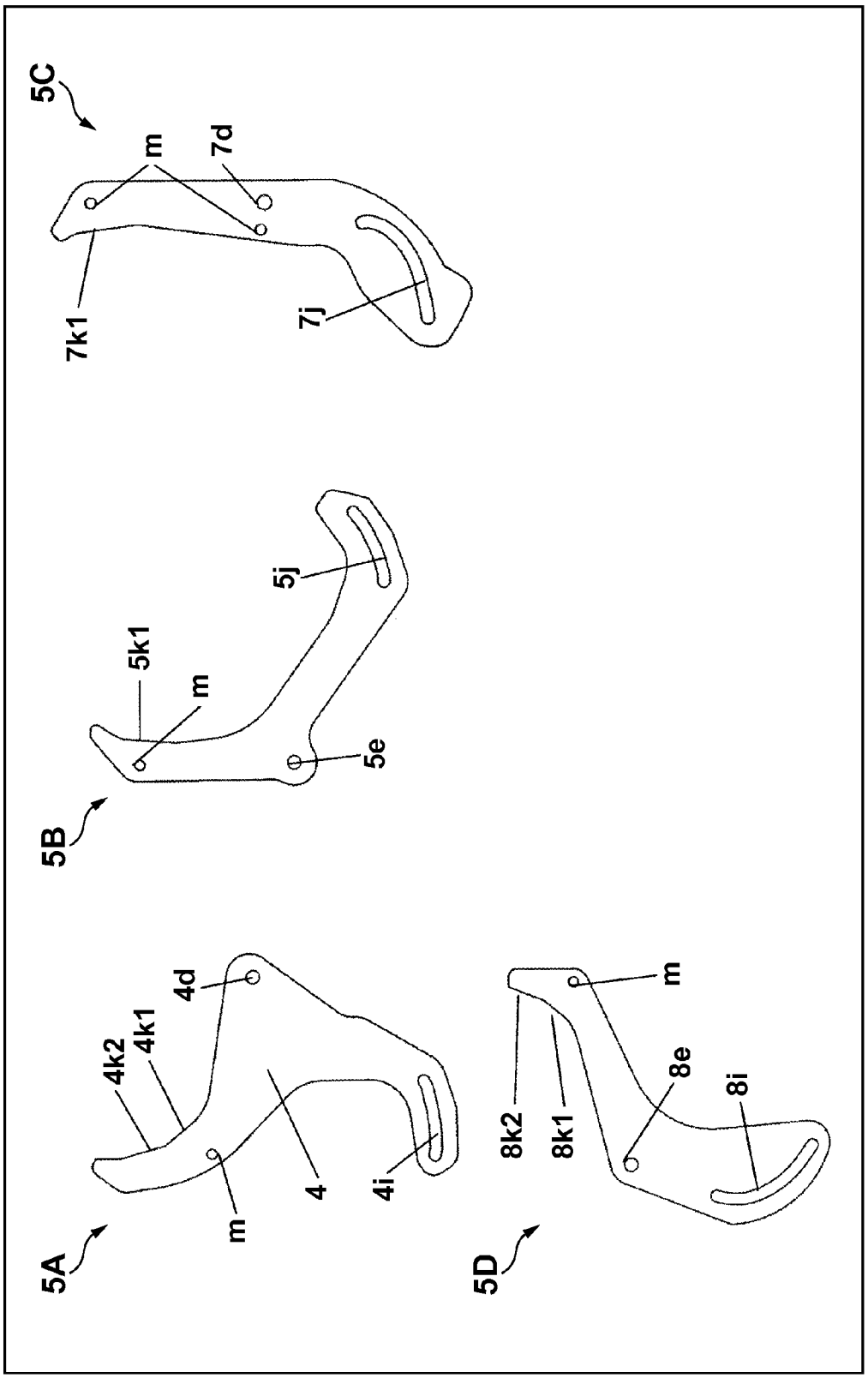
FIG. 5 is a front view showing the second aperture blade according to the first embodiment.
Figure 6:
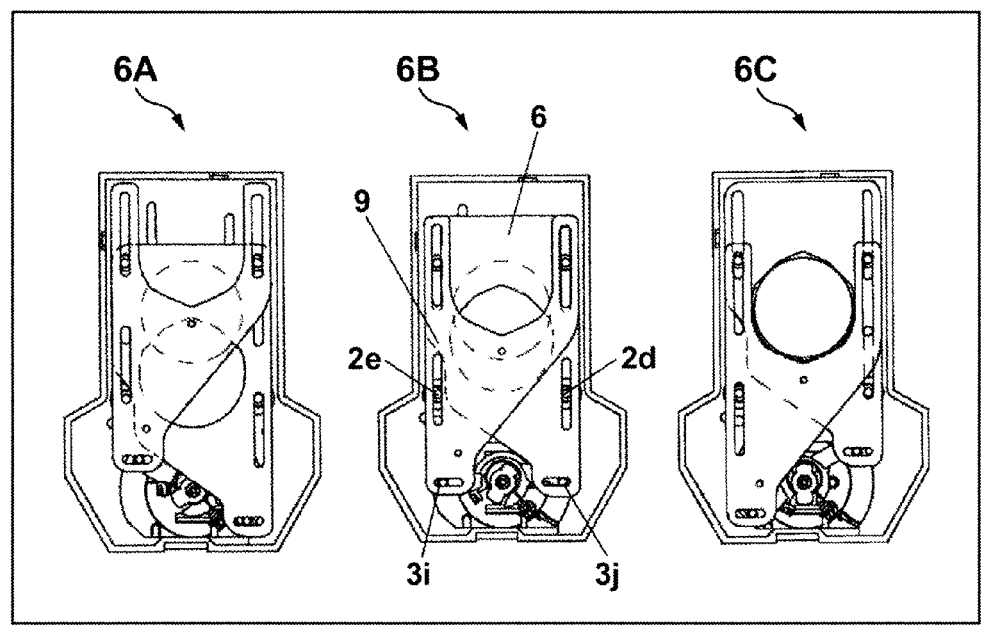
FIG. 6 is a front view showing a linear aperture blade used in the diaphragm device according to the first embodiment.
Figure 7:
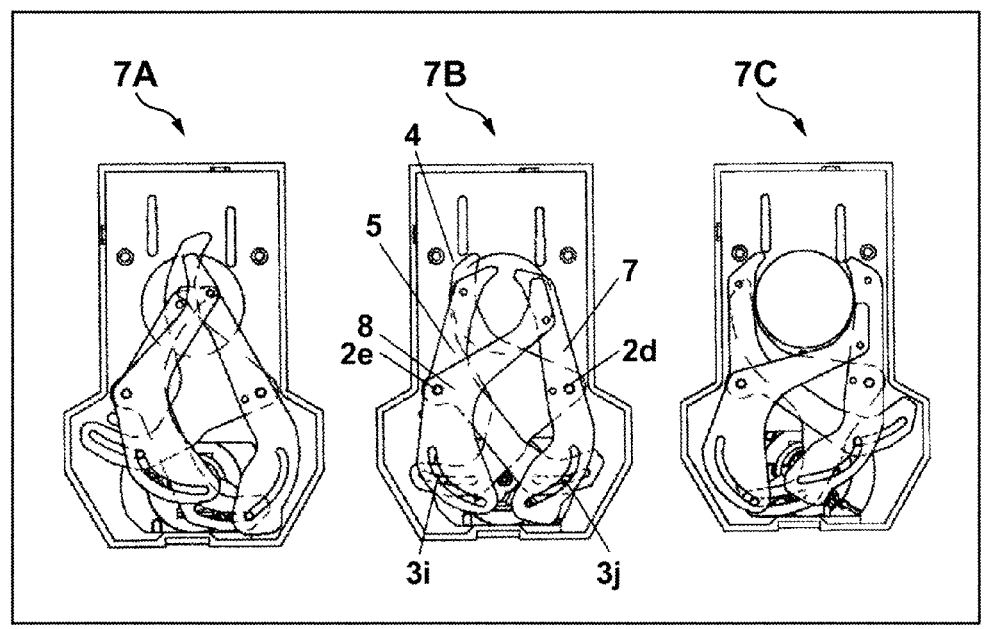
FIG. 7 is a front view showing a rotating aperture blade used in the diaphragm device according to the first embodiment.

In FIG. 4, 4A shows the linear aperture blade 6. In FIG. 4, 4B shows the linear aperture blade 9. In FIG. 5, 5A shows the rotating aperture blade 4. In FIG. 5, 5B shows the rotating aperture blade 5, 5C shows the rotating aperture blade 7. In FIG. 5, 5D shows the rotating aperture blade 8. FIG. 6 is a view showing the positions of the linear aperture blades 6 and 9 in the fully closed state in 6A, the intermediate-aperture state in 6B, and the full-aperture state in 6C. FIG. 7 is a view showing the positions of the rotating aperture blades 5, 6, 7, and 8 in the fully closed state in 7A, the intermediate-aperture state in 7B, and the full-aperture state in 7C.

The rotating aperture blade 4 is slidably engaged with the blade driving pin 3i of the driving arm 3 at a driving cam groove portion 4i. The rotation center pin 2d that is formed on the base plate 2 and serves as a rotation center portion (rotation center shaft portion) is rotatably fitted in a rotation center hole portion 4d formed in the rotating aperture blade 4.

When the driving arm 3 pivots within a predetermined angle range, the driving cam groove portion 4i receives a driving force from the blade driving pin 3i, and the rotating aperture blade 4 rotates (turns) within a plane crossing the optical axis about the rotation center pin 2d engaged with the rotation center hole portion 4d, as shown in 5A of FIGS. 5 and 7A to 7C of FIG. 7. The speed of the rotation can be adjusted by the shape of the driving cam groove portion 4i. The shape of the diaphragm aperture can also be corrected by the shape of the driving cam groove portion 4i.

The rotating aperture blade 5 is slidably engaged with the blade driving pin 3j of the driving arm 3 at a driving cam groove portion 5j. The rotation center pin 2e that is formed on the base plate 2 and serves as a rotation center portion (rotation center shaft portion) is rotatably engaged with a rotation center hole portion 5e formed in the rotating aperture blade 5.

When the driving arm 3 pivots within the predetermined angle range, the driving cam groove portion 5j receives a driving force from the blade driving pin 3j, and the rotating aperture blade 5 rotates (turns) within a plane (to be referred to as an optical axis cross plane hereinafter) crossing the optical axis about the rotation center pin 2e engaged with the rotation center hole portion 5e, as shown in 5B of FIGS. 5 and 7A to 7C of FIG. 7. The speed of the rotation can be adjusted by the shape of the driving cam groove portion 5j. The shape of the diaphragm aperture can also be corrected by the shape of the driving cam groove portion 5j.

The linear aperture blade 6 shown in 4A of FIG. 4 is slidably engaged with the blade driving pin 3j of the driving arm 3 at a driving hole portion 6j of an elongated hole shape. The guide pins 2c and 2d that are respectively formed on the base plate 2 and serve as guide portions (guide shaft portions) are slidably engaged with guide elongated hole portions 6c and 6d that are formed in the linear aperture blade 6 to extend in the optical axis cross direction.

When the driving arm 3 pivots within the above-mentioned predetermined angle range, the driving hole portion 6j receives a driving force from the blade driving pin 3j, and the linear aperture blade 6 is driven in the optical axis cross direction while the guide elongated hole portions 6c and 6d are guided by the guide pins 2c and 2d, as shown in 6A to 6C of FIG. 6.

The rotating aperture blade 7 is slidably engaged with the blade driving pin 3j of the driving arm 3 at a driving cam groove portion 7j. The rotation center pin 2d that is formed on the base plate 2 and serves as a rotation center portion (rotation center shaft portion) is rotatably fitted in a rotation center hole portion 7d formed in the rotating aperture blade 7.

When the driving arm 3 pivots within the predetermined angle range, the driving cam groove portion 7j receives a driving force from the blade driving pin 3j, and the rotating aperture blade 7 rotates (turns) within the optical axis cross plane about the rotation center pin 2d engaged with the rotation center hole portion 7d, as shown in 5C of FIG. 5 and FIG. 7. The speed of the rotation can be adjusted by the shape of the driving cam groove portion 7j. The shape of the diaphragm aperture can also be corrected by the shape of the driving cam groove portion 7j.

The rotating aperture blade 8 is slidably engaged with the blade driving pin 3i of the driving arm 3 at a driving cam groove portion 8i. The rotation center pin 2e that is formed on the base plate 2 and serves as a rotation center portion (rotation center shaft portion) is rotatably fitted in a rotation center hole portion 8e formed in the rotating aperture blade 8.

When the driving arm 3 pivots within the predetermined angle range, the driving cam groove portion 8i receives a driving force from the blade driving pin 3i, and the rotating aperture blade 8 rotates (turns) within the optical axis cross plane about the rotation center pin 2e engaged with the rotation center hole portion 8e, as shown in 5D of FIG. 5 and FIG. 7. The speed of the rotation can be adjusted by the shape of the driving cam groove portion 8i. The shape of the diaphragm aperture can also be corrected by the shape of the driving cam groove portion 8i.

The linear aperture blade 9 shown in 4B of FIG. 4 and FIG. 6 is slidably engaged with the blade driving pin 3i of the driving arm 3 at a driving hole portion 9i of an elongated hole shape. The guide pins 2e and 2f that are respectively formed on the base plate 2 and serve as guide portions (guide shaft portions) are slidably engaged with guide elongated hole portions 9e and 9f that are formed in the linear aperture blade 9 to extend in the optical axis cross direction.

When the driving arm 3 pivots within the predetermined angle range, the driving hole portion 9i receives a driving force from the blade driving pin 3i, and the linear aperture blade 9 is driven in the optical axis cross direction while the guide elongated hole portions 9e and 9f are guided by the guide pins 2e and 2f, as shown in 6A to 6C of FIG. 6.

The rotating aperture blades 4 and 5 that form the left side of the diaphragm aperture in the widthwise direction are slidably engaged with the blade driving pins 3i and 3j of the driving arm 3 at the driving cam groove portions 4i and 5j, respectively. The rotation center pins 2d and 2e that are formed on the base plate 2 and serve as rotation center portions (rotation center shaft portions) are rotatably fitted in the rotation center hole portions 4d and 5e formed in the rotating aperture blades 4 and 5, respectively.

The rotating aperture blades 7 and 8 that form the right side of the diaphragm aperture in the widthwise direction are slidably engaged with the blade driving pins 3j and 3i of the driving arm 3 at the driving cam groove portions 7j and 8i, respectively. The rotation center pins 2d and 2e that are formed on the base plate 2 and serve as rotation center portions (rotation center shaft portions) are rotatably fitted in the rotation center hole portions 7d and 8e formed in the rotating aperture blades 7 and 8, respectively.

When the driving arm 3 pivots within the predetermined angle range, the driving cam groove portions 7j and 8i receive driving forces from the blade driving pins 3j and 3i, and the rotating aperture blades 7 and 8 rotate (turn) within the optical axis cross plane about the rotation center pins 2d and 2e engaged with the rotation center hole portions 7d and 8e, respectively, as shown in 7A to 7C of FIG. 7. The speed of the rotation can be adjusted by the shapes of the driving cam groove portions 7j and 8i. The shape of the diaphragm aperture can also be corrected by the shapes of the driving cam groove portions 7j and 8i. The rotation positions of the rotating aperture blades 4, 5, 7, and 8 with respect to the pivot position of the driving arm 3 can be adjusted by the shapes of the driving cam groove portions 4i, 5j, 7j and 8i formed in the rotating aperture blades 4, 5, 7, and 8, respectively.

More specifically, the rotating aperture blades 4 and 7 that form edge portions at positions point-symmetrical about the optical axis of the diaphragm aperture are slidably engaged with the blade driving pins 3i and 3j of the driving arm 3 at the driving cam groove portions 4i and 5j. The rotation center pin 2d that is formed on the base plate 2 and serves as a rotation center portion (rotation center shaft portion) is rotatably fitted in the rotation center hole portions 4d and 7d formed in the rotating aperture blades 4 and 7. Therefore, the shape of the diaphragm aperture can be easily adjusted from facing positions with respect to the center of the diaphragm aperture by using the rotating aperture blades 4 and 7.

The rotating aperture blades 5 and 8 that form edge portions at positions point-symmetrical about the optical axis of the diaphragm aperture are slidably engaged with the blade driving pins 3j and 3i of the driving arm 3 at the driving cam groove portions 5j and 8i. The rotation center pin 2e that is formed on the base plate 2 and serves as a rotation center portion (rotation center shaft portion) is rotatably fitted in the rotation center hole portions 5e and 8e formed in the rotating aperture blades 5 and 8. Thus, the shape of the diaphragm aperture can be easily adjusted from facing positions with respect to the center of the diaphragm aperture by using the rotating aperture blades 5 and 8.

In FIG. 8, 8A shows a state in which the diaphragm aperture is fully closed, 8B shows a small-aperture state (diaphragm aperture is almost octagonal), 8C and 8D show states in which the diaphragm aperture has almost the octagonal shape or almost the decagonal shape and the size is different, 8E shows a state in which the diaphragm aperture has almost the decagonal shape or almost the dodecagonal shape, and 8F shows a full-aperture state (almost the dodecagonal shape).

As shown in FIGS. 4, 5, and 8, a diaphragm aperture of a polygonal shape close to the circular shape can therefore be formed using four or more sides out of aperture formation edge portions 4k1, 4k2, 5k1, 6k1, 6k2, 6k3, 6k4, 7k1, 8k1, 8k2, 9k1, and 9k2 of the aperture blades 4 to 9 in the respective diaphragm states of the full-aperture diaphragm (lower right 8F in FIG. 8) to the small-aperture diaphragm (upper middle 8B in FIG. 8). The rough shape of the diaphragm aperture is defined using at least the aperture formation edge portions 6k1, 6k2, 9k1, and 9k2. By using any of the aperture formation edge portions 4k1, 4k2, 5k1, 7k1, 8k1, and 8k2 arranged between the aperture formation edge portions 6k1, 6k2, 9k1, and 9k2, the diaphragm aperture can come close to the circular shape from a formed polygonal shape in directions crossing the moving directions of the linear aperture blades 6 and 9.

The small-aperture shape in 3C of FIGS. 3 and 8B of FIG. 8 is formed by the aperture formation edge portions 4k1, 9k2, 9k1, 8k1, 7k1, 6k2, 6k1, and 5k1 of the aperture blades 4 to 9, and a diaphragm aperture of almost the octagonal shape is formed. The intermediate-aperture shape in 3E of FIG. 3 is formed by the aperture formation edge portions 4k2, 4k1, 9k2, 9k1, 8k1, 8k2, 7k1, 6k2, 6k1, and 5k1 of the aperture blades 4 to 9, and a diaphragm aperture of almost the decagonal shape is formed. Further, the full-aperture shape in 3F of FIG. 3 is formed by the aperture formation edge portions 4k2, 4k1, 9k2, 9k1, 8k1, 8k2, 7k1, 6k4, 6k2, 6k1, 6k3, and 5k1 of the aperture blades 4 to 9, and a diaphragm of almost the dodecagonal shape is formed. In this embodiment, changes of the shape of the diaphragm aperture from almost the octagonal shape to almost the decagonal shape and almost the dodecagonal shape are typified. For example, when the aperture blades have aperture formation edge portions by two or more sides so that the aperture formation edge portions of the respective aperture blades are increased by every side in accordance with the driving arm and the arrangement of the respective aperture blades, the corner count (number of corner portions) of the shape of the diaphragm aperture can be increased stepwise or continuously from almost the quadrangular shape to almost the pentagonal shape, almost the hexagonal shape, . . . , almost the octadecagonal shape, and the like.

In this embodiment, after the shape of the diaphragm aperture comes close to the circular shape by the rotating aperture blades 4, 5, 7, and 8, if the diaphragm aperture is further enlarged, the shape of the diaphragm aperture further comes close to the circular shape by the linear aperture blades 6 and 9. This arrangement can change the shape of the diaphragm aperture to a desired shape in accordance with the size of the diaphragm aperture without upsizing.

It is preferable that the shape of the diaphragm aperture is the circular shape or comes close to the circular shape as much as possible. However, it is only necessary that the numbers of sides and corners increase and a polygonal shape changes close to the circular shape. In this embodiment, since the opposing corners of the polygonal shape are increased by every even number, the shape of the diaphragm aperture can come close to the circular shape without greatly losing the symmetry of the polygonal shape along with an increase in the area of the diaphragm aperture. That is, as the diaphragm aperture is enlarged, the edge portions of the diaphragm aperture include critical points or inflection points that connect the plurality of aperture formation edge portions of the aperture blades 4 to 9 at positions symmetrical about a diagonal line connecting a vertex between the aperture formation edge portions 6k1 and 6k2 and a vertex between the aperture formation edge portions 9k1 and 9k2.

In this manner, the aperture formation portions of the aperture blades 4 to 9 have a plurality of edge portions. As the aperture diameter increases, the shape of the diaphragm aperture changes to a polygonal shape which is close to the circular shape and has a large corner count. By properly adjusting the shape of at least one of the linear aperture blades 6 and 9 and the rotating aperture blades 4, 5, 7, and 8, an arc portion can be formed at at least some of edge portions forming the diaphragm aperture. When at least some of edge portions forming the diaphragm aperture are formed into an arc shape, the diameter of an aperture closer to the circular shape can be formed. A diaphragm aperture close to the circular shape can be formed by connecting the aperture formation edge portions by R. The arrangement of the aperture formation edge portions 4$k$1, 4$k$2, 5$k$1, 7$k$1, 8$k$1, and 8$k$2 of the rotating aperture blades 4, 5, 7, and 8 can be set at an angle suited to each size of the diaphragm aperture by adjusting the pivot center pivot and shape. Positions where a plurality of aperture blades overlap each other in the diaphragm aperture may be set as the corners of a polygonal shape, and sides connecting these corners may be curved lines. As long as the diaphragm aperture has a shape in which the aperture formation edge portions 4$k$1, 4$k$2, 5$k$1, 6$k$1, 6$k$2, 6$k$3, 6$k$4, 7$k$1, 8$k$1, 8$k$2, and 9$k$2 of the aperture blades 4 to 9 are bent along the opening 2$b$, the diaphragm aperture can come close to the circular shape, in comparison with forming the sides of respective edge portions by straight lines.

As described above, the diaphragm device according to this embodiment is capable of full closing, as shown in 3A of FIG. 3. The second aperture blades (rotation blades or rotation aperture blades) easily enable full closing by adjusting the driving cam groove portions engaged with the driving pins. Full closing can also be implemented without moving the first aperture blades (linear aperture blades) up to full closing, so downsizing in the longitudinal direction is also possible.

Embosses m may be provided on the aperture blades 4 to 9 in order to reduce the sliding load.

As described above, the diaphragm device according to this embodiment drives one driving arm 3 to move or rotate the respective aperture blades without using a component that rotates around the diaphragm aperture, such as a driving ring. Thus, the diaphragm device can be downsized in the longitudinal direction and widthwise direction. By providing aperture formation edge portions having critical points, as in the aperture blades 4, 6, and 8, an aperture diameter of a polygonal shape that is larger than the number of aperture blades and is close to the circular shape can be formed to decrease the thickness in the optical axis direction.

In the arrangement in which the number of sides forming the diaphragm aperture increases as the diaphragm aperture increases, a diaphragm aperture closer to the circular shape can be formed when the diaphragm aperture is enlarged.

The aperture blades are driven by the same transfer unit provided on the driving lever having a rotation center at a position spaced apart from the diaphragm aperture in a direction crossing the light passage direction. The overall device can be downsized in comparison with an arrangement in which a member such as a driving ring is rotated around the diaphragm aperture. In addition, the same shaft can be used as the guide shaft portion of the first aperture blade that is provided on the base plate, and the rotation center shaft portion of the second aperture blade that is provided on the base plate. The device can be easily downsized, which is effective for downsizing an optical device in which the device is mounted. By using the linear aperture blades and the rotating aperture blades, a desired aperture shape can be easily formed, compared to forming an aperture shape by only linear aperture blades. The stroke of the linear aperture blade that moves in the longitudinal direction need not be ensured, and the movable range of the linear aperture blade can be narrowed. Downsizing of the diaphragm device (especially, downsizing in the longitudinal direction) becomes possible.

This embodiment has explained a case in which the hole portions and the groove portions are formed in the aperture blades 4 to 9, and the pins formed on the driving arm 3 and the base plate 2 are engaged with (inserted in) the hole portions and the groove portions. However, an arrangement can also be employed, in which pins are provided on the aperture blades and inserted in hole portions and groove portions formed in the driving arm and the base plate.

(Second Embodiment)

Figure 9:
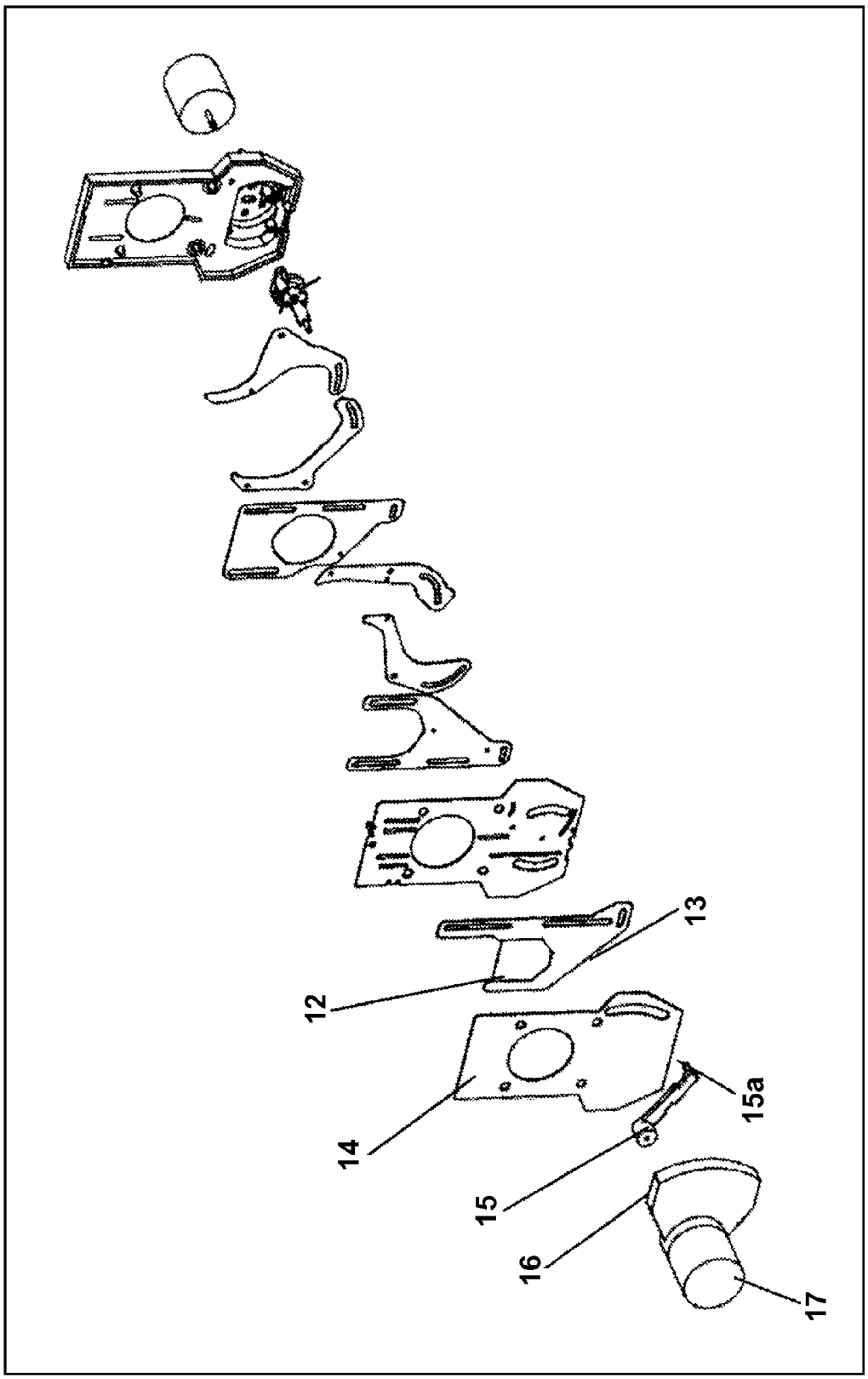
FIG. 9 is an exploded perspective view showing a diaphragm device according to the second embodiment of the present invention.

FIG. 9 is an exploded view showing a diaphragm device according to the second embodiment of the present invention. The diaphragm device according to the second embodiment is implemented by providing, in the diaphragm device shown in FIG. 1, an ND filter 12 that can move back and forth and attenuates the amount of light passing through the diaphragm aperture. In FIG. 9, the same reference numerals as those in FIG. 1 denote the same parts as those shown in FIG. 1, and a description thereof will not be repeated.

An ND holding plate 13 holds the ND filter 12. The ND holding plate 13 is arranged on a side opposite to aperture blades 4 to 9 with respect to a cover plate 10. An outer cover plate 14 forms, between the outer cover plate 14 and the cover plate 10, a space where the ND holding plate 13 is moved. The outer cover plate 14 is attached to a base plate 2.

A sub-base plate 16 on which an ND driving unit 17 is fixed is attached to the outer cover plate 14. The ND driving unit 17 is, for example, an electromagnetic driving motor that is constituted by a rotor magnet (not shown), an output shaft (not shown) that rotates together with the rotor magnet, and a coil (not shown) that is energized to generate a magnetic force for rotating the rotor magnet. The ND driving unit 17 may be a stepping motor.

An ND arm 15 is attached to (or may be formed integrally with) the output shaft of the ND driving unit 17 by press fitting, and a driving pin 15$a$ is provided at the tip of the ND arm 15. The driving pin 15$a$ extends through the outer cover plate 14 and is engaged with the ND holding plate 13. The ND holding plate 13 is guided in the optical axis cross direction by a guide pin 2$c$ and rotation center pin 2$d$ that are formed on the base plate 2. When the ND driving unit 17 pivots the ND arm 15, the ND holding plate 13 moves rectilinearly in the optical axis cross direction, and the ND filter 12 moves back and forth with respect to the diaphragm aperture.

The ND holding plate 13 may be driven in the optical axis cross direction while it swings, like the linear aperture blades 6 and 9.

As described above, the present invention is applicable to even the diaphragm device including the ND filter. By covering the diaphragm aperture by the ND filter 12, the light amount can be decreased without narrowing down the diaphragm aperture so much. Degradation of the image quality by so-called small-aperture diffraction can therefore be avoided. Since the shape of a ghost or blur also becomes close to the circular shape, an image of higher image quality can be obtained.

(Third Embodiment)

An example of a housing structure in the diaphragm device according to one of the first and second embodiments will be described. In the third embodiment, projecting portions 2$r$ and 10$r$ and the like (to be described later) are added to the structure according to the first embodiment. The same reference numerals as those in FIG. 1 denote the same parts as those described in the first or second embodiment, and a description thereof will not be repeated.

Figure 10:
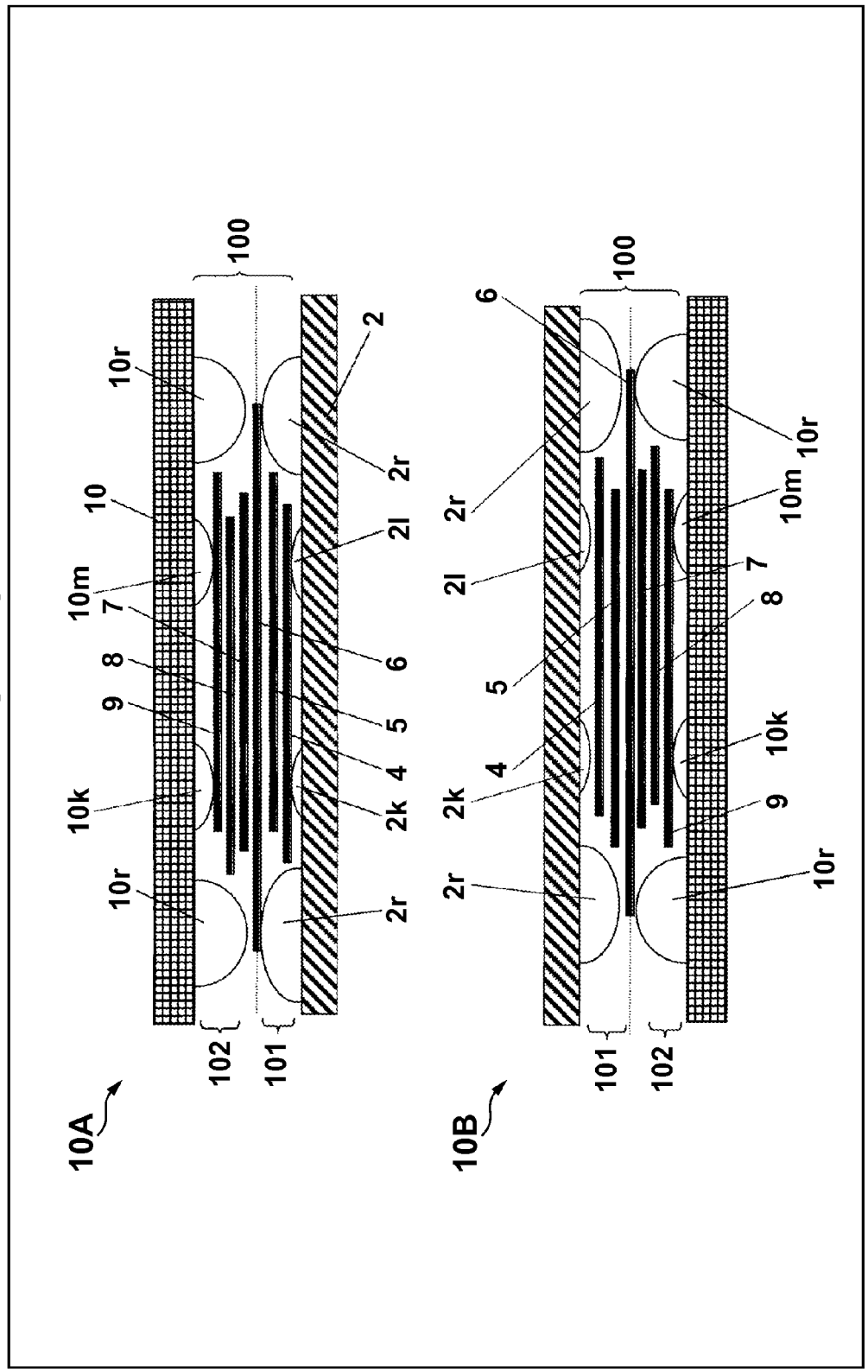
FIG. 10 is a sectional view showing a diaphragm device according to the third embodiment of the present invention.

As shown in 10A and 10B of FIG. 10, a case member 10 constituting part of a housing in the diaphragm device is engaged with shafts 2$c$, 2$d$, 2$e$, and 2$f$ on one surface side of a base plate 2 to form, between the case member 10 and the base plate 2, a blade accommodation space (blade chamber 100) that accommodates aperture blades 4 to 9. The case member 10 has a fixed opening 10b corresponding to a fixed opening 2b formed in the base plate 2. More specifically, in a state in which the case member 10 is engaged with the base plate 2, the fixed opening 10b of the case member 10 communicates with the fixed opening 2b of the base plate 2, forming a light passage route extending through the housing of the diaphragm device.

The housing of the diaphragm device incorporates a blade chamber formation member that partitions the blade chamber 100 into a plurality of blade chambers. In this embodiment, the blade chamber formation member is formed by, for example, the aperture blade 6 out of the aperture blades 4 to 9. More specifically, the aperture blade 6 functions as a partition blade, and divides the internal space of the housing into a blade chamber 101 on the side of the base plate 2 and a blade chamber 102 on the side of the case member. The aperture blade 6 is a blade that moves rectilinearly for light amount adjustment. The aperture blade 6 is so formed as to substantially cover a portion facing the outer edge portion of the fixed opening 2b (10b) forming the light passage route, especially, edge portions on two sides in a direction perpendicular to the rectilinear moving direction. In these regions, the aperture blade 6 functions as at least the blade chamber partition member. Even if the aperture blade 6 is moved rectilinearly, the portion facing the outer edge portion of the fixed opening 2b (10b) serves as a region where the aperture blade 6 substantially exists. At at least this portion, the space (blade chamber) in which the remaining aperture blades move can be partitioned. Accordingly, the aperture blade 6 can partition the blade chamber serving as the moving space of the plurality of aperture blades 4 to 9. Thus, a member or structure for partitioning the blade chamber can be omitted, which is advantageous in cost reduction and downsizing.

Projecting portions that contact the aperture blade 6 partitioning the above-mentioned blade chamber and assist movement of the aperture blade 6 are provided on the inner wall of the housing constituting the sheath of the diaphragm device. For example, in this embodiment, rail-like projecting portions 2r extending in the moving direction of the linear aperture blade 6 are provided on the base plate 2. The plurality of projecting portions 2r are provided at an interval between them on the base plate 2. The two rail-like projecting portions 2r are provided on the distal end side of the aperture blade 6 that is opposite to the proximal end side of the aperture blade 6 on the side of a driving arm 3 with respect to the opening portion 2b. The two rail-like projecting portions 2r are provided on the distal end side on the base plate 2 on the side of the opening portion 2b with respect to guide pins 2c to 2f. Hence, a wide space out of a gap at which the aperture blades 4 and 5 do not move can be utilized, and a plurality of projecting portions for supporting the barycenter of the aperture blade 6 can be efficiently arranged on the base plate 2. Even on the proximal end side of the aperture blade 6 between the rotation center pin 2d and the arm member 3, a point-like projecting portion 2r is provided outside the moving ranges of the aperture blades 4 and 5. Since the distal end side of the aperture blade 6 is supported by the projecting portions 2r, the blade chamber 100 is partitioned to form the blade chamber 101 on the side of the base plate 2 on the aperture blade 6. The aperture blades 4 and 5 are movable in the blade chamber 101, and the aperture blades 4 and 5 narrow down one side (left side in FIG. 1) of the opening portion 2b of the base plate 2 in the widthwise direction.

Rail-like projecting portions 10r extending in the moving direction of the linear aperture blade 6 are provided on the inner wall of the case member 10 corresponding to the base plate 2 of the housing constituting the sheath of the diaphragm device. The plurality of projecting portions 10r are provided on the case member 10, and has a gap at which the aperture blade 6 can move stably between the projecting portions 2r and the projecting portions 10r. The two rail-like projecting portions 10r are provided on the distal end side of the aperture blade 6. A point-like projecting portion 10r is provided outside the moving ranges of the aperture blades 7 to 9 even on the proximal end side of the aperture blade 6 between the rotation center pin 2e and the arm member 3. The two rail-like projecting portions 10r are provided on the side of the opening portion 2b with respect to the guide pins 2c to 2f and on the distal end side on the case member 10. Thus, a wide space out of a gap at which the aperture blades 7 to 9 do not move can be used, and a plurality of projecting portions for supporting the barycenter of the aperture blade 6 can be efficiently arranged on the case member 10. Since the distal end side of the aperture blade 6 is supported by the projecting portions 10r, the blade chamber 100 is partitioned to form the blade chamber 102 on the side of the case member 10 on the aperture blade 6. The aperture blades 7 to 9 are movable in the blade chamber 102, and the aperture blades 7 to 9 narrow down the right and lower sides of the opening portion 10b in FIG. 1.

In this embodiment, the projecting portions 2r and 10r have a shape rounded toward the vertex of the projecting portion to reduce the contact area when they contact the aperture blade 6. While the aperture blade 6 slides on the vertex portion of the rail-like projecting portions 2r or 10r, it line-contacts the projecting portions 2r or 10r in the moving direction of the aperture blade 6. The aperture blade 6 is therefore supported at a substantially low frictional resistance with respect to the projecting portions 2r and 10r. That is, the aperture blade 6 is assisted by the projecting portions 2r or 10r and is stably moved by the arm member 3 together with the aperture blades 4, 5, 7, 8, and 9 in the divided blade chambers. In addition, the three projecting portions 2r or the three projecting portions 10r support the aperture blade 6 at the same height from the housing in an arrangement in which they form a triangular shape including at least the light passage route. That is, the aperture blade 6 is supported by the projecting portions 2r or 10r, so stable driving can be implemented while the aperture blade 6 moves as a blade, regardless of the use posture of an image capturing apparatus in which the light amount adjustment device is mounted. Therefore, the spaces of the blade chambers 101 and 102 can be stably ensured. Further, the left side of the opening portion 2b is narrowed down by a plurality of adjacent aperture blades in the blade chamber 101, and the right side of the opening portion 2b that faces the left side of the opening portion 2b is narrowed down in the blade chamber 102. With this structure, the two sides of the opening portion 2b in the widthwise direction can be narrowed down with a good sliding property. In accordance with the diameter of the diaphragm aperture, the peripheral portion of an opening portion 6b of the aperture blade 6 moves to a position where the peripheral portion partially covers the opening portions 2b and 10b.

Of the aperture blades 4 to 9, the aperture blade 6 is supported by the projecting portions 2r and/or the projecting portions 10r, and functions as the blade chamber formation member that divides and partitions the blade chamber 100 in which the aperture blades 4 to 9 move, into the blade chamber 101 in which the aperture blades 4 and 5 move and the blade chamber 102 in which the aperture blades 7 t 9 move. That is, the two blade chambers (traveling spaces of the respective blades) can be stably ensured by the aperture blade 6 regardless of the use posture of the image capturing apparatus in which the light amount adjustment device is mounted. Hence, the sliding (frictional stress) between the aperture blades 7 to 9 or between the aperture blades 4 and 5 in each blade chamber can be reduced. The above-described arrangement can implement stable driving of a plurality of blade groups in the light amount adjustment device. For example, in this embodiment, the aperture blades 4 and 5 that pivot in the blade chamber 101 narrow down the opening portion 6b from one side (left side in FIG. 1) in a direction crossing the moving direction of the aperture blade 6 at the peripheral portion of the opening portion 6b of the aperture blade 6 functioning as the partition of the blade chamber 100. The aperture blades 7 and 8 that pivot in the blade chamber 102 narrow down the opening portion 6b from the other side (right side in FIG. 1) in a direction crossing the moving direction of the aperture blade 6. That is, the aperture blades 4 and 5 and the aperture blades 7 and 8 are arranged to face each other via the opening portion 6b, and the aperture blade 6 is interposed between the aperture blades 4 and 5 and the aperture blades 7 and 8. In other words, a structure is implemented, in which the aperture blade 6 separates the moving space (blade chamber 101) of the aperture blades 4 and 5 and the moving space (blade chamber 102) of the aperture blades 7 and 8 so that these moving spaces become independent of each other, and the interference between the paired blade groups facing each other via the opening portion 6b is substantially prevented. Stable driving of the paired blade groups can be implemented in the blade chambers 101 and 102 partitioned by the aperture blade 6, and light amount adjustment can be performed at high accuracy. At this time, even the third embodiment adopts an arrangement in which the number of sides of a polygonal shape is increased when the diaphragm aperture (light passage aperture) of a polygonal shape formed by annularly superposing the aperture blades 4 to 8 by the arrangement of them. When the number of sides of the polygonal shape constituting the shape of the diaphragm aperture changes, the contact area between the aperture blades and the angle between the blades change. Accordingly, even when the contact area between the aperture blades and the angle between the blades change, the sliding resistance can be reduced to stably drive blades because the projecting portions that contact the blade chamber formation member and assist movement of the blade chamber formation member are provided on the inner wall of the housing.

As shown in 10A and 10B of FIG. 10, in accordance with the posture of the light amount adjustment device, the linear aperture blade 6 comes into contact with the rail-like projecting portions 2r that extend in the moving direction of the linear aperture blade 6 and are provided on the base plate 2, or the rail-like projecting portions 10r provided on the case member 10. The projecting portions 2r and 10r are formed with a shape rounded toward the vertex of the projecting portion so that the vertices of the projecting portions line-contact the linear aperture blade 6. In FIG. 10, 10A is a view showing a state of the blade chamber 100 when photographing is performed in a posture in which the base plate 2 faces down. In FIG. 10, 10B is a view showing a state of the blade chamber 100 when photographing is performed in a posture in which the case member 10 faces down.

In the respective postures, the linear aperture blade 6 functions as the blade chamber formation member, movement of which is assisted by the projecting portions 2r or 10r provided at a plurality of distant positions, and which partitions the blade chamber 100 serving as the internal space of the base plate 2 to form the plurality of blade chambers 101 and 102. By distributing the load of any of the aperture blades 4, 5, 7, 8, and 9 to the linear aperture blade 6 serving as the blade chamber formation member, loads applied particularly to aperture blades in contact with the base plate 2 and the case member 10, such as the aperture blades 4 and 9, can be reduced to stably drive a plurality of aperture blades. Of the pair of linear aperture blades, a linear aperture blade having a larger area is interposed between pivoting aperture blades in the optical axis direction. This linear aperture blade is supported by the rail-like projecting portions installed on the base member or the case member, and acts as a partition plate that partitions the blade chamber. The blade chamber formation member can take a structure in which the blade chamber of the aperture blades formed between the base member and the case member is divided, and the load of aperture blades accommodated in one blade chamber is not applied to aperture blades accommodated in the other blade chamber. As a result, the frictional load generated at a sliding portion between each aperture blade and the base member or case member is reduced. The sliding of the aperture blade becomes smooth, and stable light amount adjustment becomes possible regardless of the posture difference. The aperture blade functions as a partition plate, the device can be easily downsized, which is effective for downsizing an image capturing apparatus in which the device is mounted. The possibility of generation of a performance difference that makes the exposure amount vary depending on the posture difference can be reduced especially in a light amount adjustment device mounted in a portable image capturing apparatus. In this embodiment, aperture blades that rotate are used as the aperture blades 4, 5, 7, and 8. When the aperture blade 6 aims to function as the partition plate, aperture blades that move rectilinearly may be used as the aperture blades 4, 5, 7, and 8, or aperture blades that move rectilinearly and aperture blades that rotate may be combined. If projecting portions are formed in the moving direction, an aperture blade that rotates can be used even as the aperture blade functioning as the partition plate. The heights of projecting portions that support respective aperture blades configured to rotate may be set for the respective aperture blades that rotate so that the aperture blades function as one partition plate.

As shown in 10A and 10B of FIG. 10, the case member 10 is attached to the base plate 2 to form, between the case member 10 and the base plate 2, the blade chamber 100 in which the aperture blades 4 to 9 move. As shown in FIG. 1, the case member 10 has the opening 10b corresponding to the fixed opening 2b formed in the base plate 2. The case member 10 is fabricated by press working, resin molding, or the like. As shown in 11A to 11F of FIG. 11, projecting portions 10k, 10l, 10m, and 10r for reducing the sliding resistance with the aperture blades 4 to 9 are formed on the inner surface (surface on the side of the base plate 2) of the case member 10. Projecting portions 2k, 2l, and 2r for reducing the sliding resistance with the aperture blades 4 to 9 are formed even on the inner surface of the base plate 2. Note that the case member 10 is fabricated by press working, resin molding, or the like. The base plate 2 and the case member 10 function as a housing that forms the blade chamber in the internal space. When retaining members are attached to the shafts 2c, 2d, 2e, and 2f, the case member can also be omitted. When a through hole through which the aperture blade can move is formed in the side surface of the housing, projecting portions above and below the through hole can be regarded as projecting portions provided on the inner wall of the housing.

Figure 11:
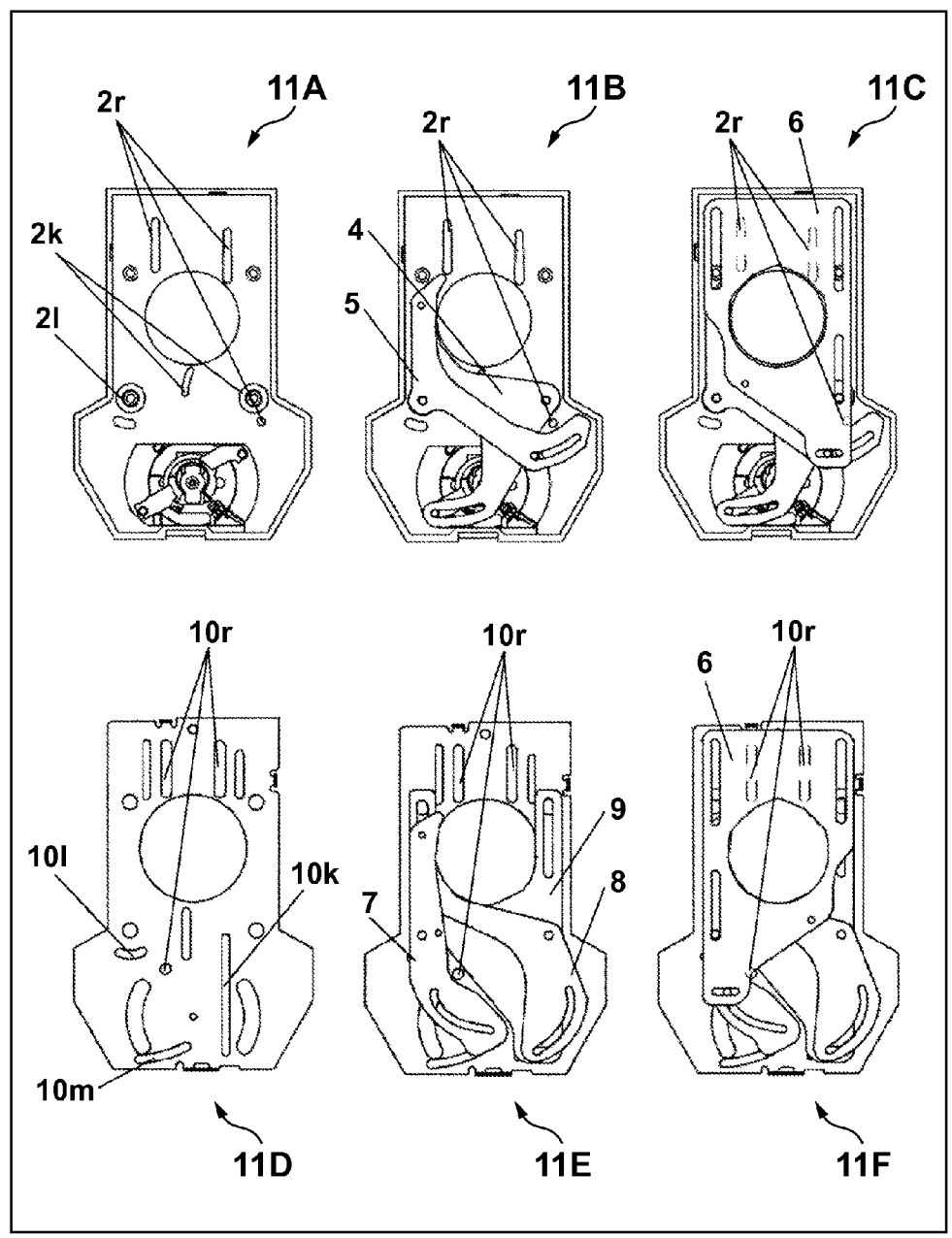
FIG. 11 is a view showing the positional relationship between a base plate, a case member, respective projecting portions, and aperture blades according to the third embodiment.

In FIG. 10, 10A shows a case in which the linear aperture blade 6 is supported by the plurality of projecting portions 2r that are provided on the base plate 2 and have the same height. In FIG. 11, 11A shows the positional relationship, with respect to the base plate 2, of the projecting portions 2k and 2l that are provided on the base plate 2 and have a small height for the rotating aperture blade. In FIG. 11, 11B is a view in which the rotating aperture blade 4 is arranged in contact with the projecting portion 2k and the rotating aperture blade 5 is arranged in contact with the projecting portion 2l. In FIG. 11, 11C is a view in which the linear aperture blade 6 is arranged on the rotating aperture blades 4 and 5.

In FIG. 10, 10B shows a case in which the linear aperture blade 6 is supported by the plurality of projecting portions 10r that are provided on the case member 10 and have the same height. In FIG. 11, 11D shows the positional relationship, with respect to the case member 10, of the projecting portions 10k, 10l, and 10m that are provided on the case member 10 and have a small height for the rotating aperture blade. In FIG. 11, 11E is a view in which the linear aperture blade 9 is arranged in contact with the projecting portion 10k, the rotating aperture blade 8 is arranged in contact with the linear aperture blade 9 on the projecting portion 10k, and the rotating aperture blade 7 is arranged in contact with the projecting portions 10m and 10l. In FIG. 11, 11F is a view in which the linear aperture blade 6 is arranged on the rotating aperture blades 4 and 5.

In 10A of FIG. 10, the projecting portions 2r that support the linear aperture blade 6 are larger in projection amount toward the inside of the blade chamber than the projecting portions 2k and 2l that support the rotating aperture blades 4 and 5. Accordingly, the aperture blades 4 and 5 move with a good sliding property in the space formed by the base plate 2, the projecting portions 2r, and the linear aperture blade 6. The posture of the linear aperture blade 6 is maintained to be parallel by the plurality of projecting portions 2r having the same height within the moving range in the blade chamber 100. At this time, when the barycenter of the linear aperture blade 6 during movement is always positioned within a range defined by connecting portions of a triangular shape at which the three projecting portions 2r contact the blade chamber formation member, the postures of the housing and blade chamber formation member are maintained to be parallel. The projecting portions 2r and 10r are provided on the base plate 2 and the case member 10, respectively, at an interval in the direction of thickness of the housing so as to partition the blade chamber 100 by the linear aperture blade 6 and form spaces where the aperture blades move.

In 10B of FIG. 10, the projecting portions 10r that support the linear aperture blade 6 are larger in projection amount toward the inside of the blade chamber than the projecting portions 2k and 2l that support the aperture blades 7 to 9. Thus, the aperture blades 7 to 9 move with a good sliding property in the space formed by the case member 10, the projecting portions 10r, and the linear aperture blade 6. The posture of the linear aperture blade 6 is maintained to be parallel by the plurality of projecting portions 10r having the same height within the moving range in the blade chamber 100. At this time, when the barycenter of the linear aperture blade 6 during movement is always positioned within a range defined by connecting portions of a triangular shape at which the three projecting portions 10r contact the blade chamber formation member, the postures of the housing and blade chamber formation member are maintained to be parallel.

When the linear aperture blade 6 slides while being supported by the projecting portions 2r provided on the base plate 2, the aperture blades 4 and 5 exist in the blade chamber 101 on the side of the base plate 2, and the aperture blades 7 to 9 exist in the blade chamber 102 on the side of the case member 10. In this manner, the blade chamber 100 is divided into two at the boundary of the linear aperture blade 6. Similarly, when the linear aperture blade 6 slides while being supported by the projecting portions 10r provided on the case member 10, the blade chamber 100 is divided into two. For example, even when photographing is performed with the base plate 2 facing down, the loads of the aperture blades 7 to 9 accommodated in the blade chamber 102 are supported by the linear aperture blade 6 and the projecting portion 2r. Thus, the aperture blades 4 and 5 accommodated in the blade chamber 101 can slide smoothly without receiving the loads of the aperture blades 7 to 9 accommodated in the blade chamber 102 and the load of the linear aperture blade 6. When the light amount adjustment device is mounted in an image capturing apparatus, the base plate 2, the aperture blade 4, the aperture blade 5, the linear aperture blade 6 supported by the projecting portions 2r or 10r, the aperture blade 7, the aperture blade 8, the linear aperture blade 9, and the case member 10 are arranged in order in the optical axis direction. More specifically, the aperture blades 4 and 5 accommodated in one blade chamber 101 are pivoted in the blade chamber 101 serving as a gap formed by the base plate 2 serving as one surface of the housing, the projecting portions 2r, and the linear aperture blade 6. The aperture blades 4 and 5 can pivot smoothly without receiving the loads of the blades 7 to 9 and the linear aperture blade 6. The two rail-like projecting portions 2r are provided on the distal end side opposite to the proximal end side of the aperture blade 6 serving as the side of the driving arm 3 with respect to the opening portion 2b in the base plate 2. Hence, the blade chamber 101 serving as the gap can utilize a wide space outside the moving ranges of the aperture blades 4 and 5, and the plurality of projecting portions for supporting the barycenter of the aperture blade 6 can be efficiently arranged on the base plate 2. The aperture blades 7 to 9 accommodated in the other blade chamber 102 are pivoted in the blade chamber 102 serving as a gap formed by the case member 10 serving as one surface of the housing, the projecting portions 10r, and the linear aperture blade 6. The aperture blades 7 to 9 can pivot smoothly without receiving the loads of the blades 4 and 5 and the linear aperture blade 6. The two rail-like projecting portions 10r are provided on the distal end side opposite to the proximal end side of the aperture blade 6 serving as the side of the driving arm 3 with respect to the opening portion 10b in the case member 10. The blade chamber 102 serving as the gap can utilize a wide space outside the moving ranges of the aperture blades 7 to 9, and the plurality of projecting portions for supporting the barycenter of the aperture blade 6 can be efficiently arranged on the case member 10. With the above-described arrangement, a desired aperture shape can be smoothly obtained using the aperture blades that rotate.

By adopting the above-mentioned arrangement, one of the aperture blades that form the diaphragm aperture can be used as a spacer that prevents interference between the aperture blades, or a partition plate that prevents interference between the blades. The remaining aperture blades can be driven stably. It is preferable to provide the projecting portions on the housing by integral molding. However, the projecting portions can also be fixed to the housing by insert molding or the like, or may be provided by another member in the housing.

In this embodiment, the linear aperture blade 6 having an almost circular opening portion is used as the blade chamber formation member. However, the blade chamber formation member suffices to be a member that partitions the blade chamber to form a plurality of blade chambers. It is only necessary that projecting portions which contact the blade chamber formation member and assist movement are provided on the inner wall of the housing.

In this embodiment, the aperture blade 4 and the like that pivot are combined with the aperture blade 6 and the like that move rectilinearly, so that the shape of the diaphragm aperture comes close to the circular shape from a polygonal shape when viewed from the optical axis direction. Also, the plurality of aperture blades such as the aperture blade 4 are arranged to face each other and pivot so that the cross region of the aperture blade 6 and the like that move rectilinearly so as to move back and forth are sandwiched from two sides. As for the aperture blade 4 and the like that pivot, the shape of the diaphragm aperture can quickly change from the polygonal shape to the circular shape. In this embodiment, the plurality of aperture blades such as the aperture blades 4 and 6 are superposed and combined in the optical axis direction in order to form a predetermined diaphragm aperture. This embodiment therefore employs an arrangement in which the aperture blade 6 and the like that move rectilinearly are supported by the projecting portions 2r provided on the base plate 2 and the like, and are guided in a state in which a predetermined traveling posture is maintained, in order to implement stable movement of the respective aperture blades 4 and 6 and the like. The projecting portions 2r and the like are provided at positions where they do not interfere with the arrangement layout, that is, movable ranges of the aperture blades 4 and 6 and the like for forming a predetermined diaphragm aperture shape. More specifically, in this embodiment, the aperture blade 6 and the like that move rectilinearly, and the aperture blade 4 and the like that pivot are aggregated in one driving transfer region (end region on one end side of the base plate 2) to downsize the entire unit. To achieve this, the projecting portions 2r and the like are provided on an end region on the other end side of the base plate 2. That is, the projecting portions 2r and the like are provided at an end portion opposite to one driving transfer region described above on the base plate 2. The projecting portions 2r and the like can be provided in the movable range of the aperture blade 6 and the like that move rectilinearly, without preventing movement of the aperture blade 4 and the like that pivot. The aperture blade 6 and the like, which move rectilinearly, stably move rectilinearly along the projecting portions 2r of the base plate 2 and the like. As a result, the blade chambers 101 and 102 are formed between the aperture blade 6 and the like that move rectilinearly, the base plate 2, the case member 10, and the like. In the blade chambers 101 and 102, the blade 4 and the like that pivot can stably move. Even if the plurality of aperture blades 4 and 6 and the like are superposed and combined in the optical axis direction in order to form a predetermined diaphragm aperture, the aperture blades 4 and 6 and the like can stably move. As a consequence, a predetermined diaphragm aperture can be stably formed.

(Fourth Embodiment)

Figure 12:
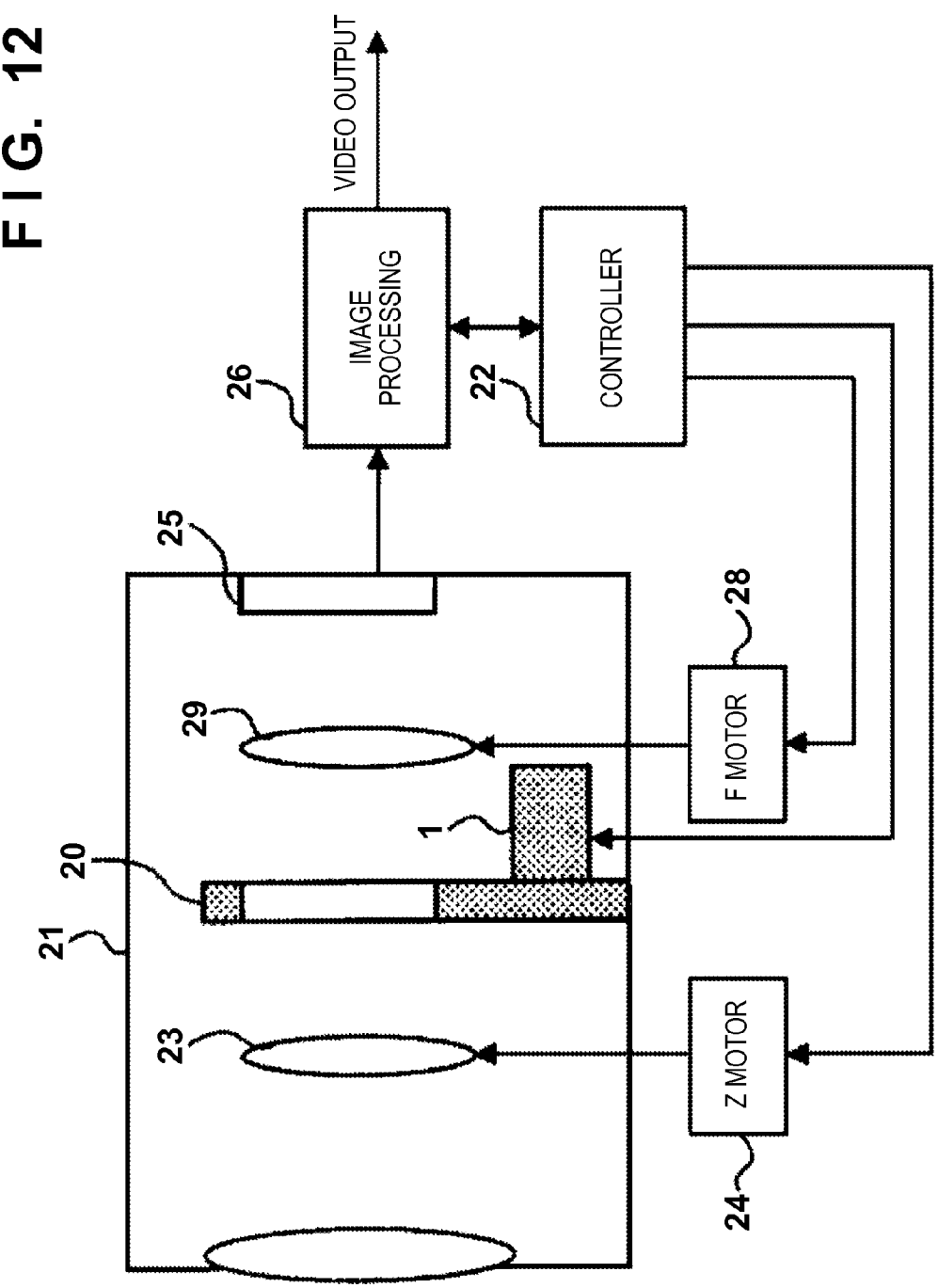
FIG. 12 is a schematic view showing an optical device according to an embodiment of the present invention.

FIG. 12 shows the schematic arrangement of a video camera (image capturing apparatus) serving as an optical device in which the diaphragm device described in one of the first to third embodiments is mounted.

The video camera includes a lens barrel 21. The lens barrel 21 accommodates a photographing optical system including a zoom lens 23, a diaphragm device 20 according to one of the first and second embodiments, and a focus lens 29.

An image sensor 25 is constituted by a photoelectric conversion element such as a CCD sensor or a CMOS sensor. The image sensor 25 photoelectrically converts an object image formed by the photographing optical system, and outputs an electrical signal. The brightness of the object image (that is, the amount of light that reaches the image sensor 25) formed on the image sensor 25 can be appropriately set by changing the diaphragm aperture of the diaphragm device 20 or moving back and forth an ND filter.

The electrical signal output from the image sensor 25 undergoes various image processes by an image processing circuit 26, thereby generating a video signal (video output).

In accordance with an operation to a zoom switch (not shown) by the user, a controller 22 controls a zoom motor 24 to move the zoom lens 23 and perform zooming. Also, the controller 22 detects the contrast of the video signal, controls a focus motor 28 in accordance with the contrast, and moves the focus lens 29 to perform auto focusing.

Further, the controller 22 controls a diaphragm driving unit 1 (and an ND driving unit) of the diaphragm device 20 based on luminance information out of the video signal, and adjusts the light amount. Accordingly, a blur or ghost at the time of photographing can be changed into a natural shape, and a high-quality video can be recorded. Since the diaphragm device 20 incorporated in the lens barrel 21 is small in size, the lens barrel and the overall video camera can be downsized.

(Summary of Embodiments)

1. According to the embodiment, there is provided a light amount adjustment device including:
    at least one first light amount adjustment blade configured to move rectilinearly in a direction crossing a light passage direction; and
    at least one second light amount adjustment blade configured to pivot within a plane crossing the light passage direction,
    wherein when a light passage aperture formed by annularly superposing the first light amount adjustment blade and the second light amount adjustment blade is enlarged, a shape of the light passage aperture comes close to a circular shape from a polygonal shape.

2. According to the embodiment, there is provided the light amount adjustment device, including:
    a housing configured to accommodate the first light amount adjustment blade and the second light amount adjustment blade; and
    a blade chamber formation member configured to partition an internal space of the housing and form a plurality of blade chambers,
    wherein the blade chamber formation member is formed from at least one blade out of the first light amount adjustment blade and the second light amount adjustment blade, and
    a projecting portion configured to contact the blade chamber formation member and assist movement of the blade chamber formation member is provided on an inner wall of the housing.

3. According to the embodiment, there is provided the light amount adjustment device, including:
    a plurality of the first light amount adjustment blades; and
    a plurality of the second light amount adjustment blades,
    wherein the plurality of first light amount adjustment blades are arranged to face each other and move rectilinearly, and
    the shape of the light passage aperture is deformed by pivoting the plurality of second light amount adjustment blades with respect to the plurality of first light amount adjustment blades.

4. According to the embodiment, there is provided the light amount adjustment device, wherein an arc portion is formed at an edge portion forming the light passage aperture by pivoting the second light amount adjustment blade in a direction in which the light passage aperture is enlarged.

5. According to the embodiment, there is provided the light amount adjustment device, wherein the shape of the light passage aperture is made close to the circular shape from the polygonal shape by pivoting the second light amount adjustment blade along with rectilinear movement of the first light amount adjustment blade in the direction in which the light passage aperture is enlarged.

6. According to the embodiment, there is provided the light amount adjustment device, wherein as the light passage aperture is enlarged, the number of corners in the light passage aperture is increased by every even number.

7. According to the embodiment, there is provided the light amount adjustment device, further including a base member including a driving arm configured to drive the first light amount adjustment blade and the second light amount adjustment blade,
   wherein the base member includes a rotation center shaft of the second light amount adjustment blade driven by the driving arm.

8. According to the embodiment, there is provided the light amount adjustment device, including a plurality of the second light amount adjustment blades,
   wherein the rotation center shaft communicates with a rotation center hole provided in each of the plurality of second light amount adjustment blades.

9. According to the embodiment, there is provided a light amount adjustment device including:
   at least one first light amount adjustment blade configured to move rectilinearly in a direction crossing a light passage direction; and
   at least one second light amount adjustment blade configured to pivot within a plane crossing the light passage direction,
   wherein when a light passage aperture of a polygonal shape formed by annularly superposing the first light amount adjustment blade and the second light amount adjustment blade is enlarged, the number of sides of the polygonal shape increases.

10. According to the embodiment, there is provided the light amount adjustment device, wherein at least one of the first light amount adjustment blade and the second light amount adjustment blade forms the light passage aperture including an arc portion.

11. According to the embodiment, there is provided an optical device including the light amount adjustment device.

12. According to the embodiment, there is provided a light amount adjustment device including:
    a plurality of light amount adjustment blades configured to be movable with respect to a light passage route;
    a housing configured to accommodate the plurality of light amount adjustment blades; and
    a blade chamber formation member configured to partition an internal space of the housing and form a plurality of blade chambers,
    wherein the blade chamber formation member is formed from at least one blade out of the plurality of light amount adjustment blades, and
    at least one projecting portion configured to contact the blade chamber formation member and assist movement of the blade chamber formation member is provided on an inner wall of the housing.

13. According to the embodiment, there is provided the light amount adjustment device, wherein a plurality of the projecting portions equal in height are provided on the inner wall of the housing.

14. According to the embodiment, there is provided the light amount adjustment device, wherein a moving posture of the blade chamber formation member is maintained by a plurality of projecting portions equal in height within a moving range in the housing.

15. According to the embodiment, there is provided the light amount adjustment device, wherein three projecting portions are provided on the inner wall of the housing, and the three projecting portions support the blade chamber formation member at three points of a triangular shape.

16. According to the embodiment, there is provided the light amount adjustment device, wherein the projecting portion has a shape rounded toward a vertex of the projecting portion, and the vertex of the projecting portion contacts the blade chamber formation member.

17. According to the embodiment, there is provided the light amount adjustment device, wherein the projecting portion extends in a moving direction of the blade chamber formation member, and a distal end portion of the projecting portion line-contacts the blade chamber formation member.

18. According to the embodiment, there is provided the light amount adjustment device, wherein
    the plurality of light amount adjustment blades include pivoting blades configured to pivot in an internal space of the housing, and a linearly moving blade configured to move linearly in the internal space of the housing, and
    the pivoting blades are arranged in the respective blade chambers.

19. According to the embodiment, there is provided the light amount adjustment device, wherein
    another projecting portion smaller in height than the projecting portion is provided on the inner wall of the housing, and
    the other projecting portion contacts the pivoting blade and assists movement of the pivoting blade.

20. According to the embodiment, there is provided the light amount adjustment device, wherein
    the housing includes an opening portion configured to transmit light, and
    the light amount adjustment device further comprises an arm member to be moved with respect to the opening portion by one driving source for the plurality of light amount adjustment blades.

21. According to the embodiment, there is provided the light amount adjustment device, wherein when a light passage aperture formed by annularly superposing the plurality of light amount adjustment blades is enlarged, a shape of the light passage aperture comes close to a circular shape from a polygonal shape.

22. According to the embodiment, there is provided the light amount adjustment device, wherein the plurality of light amount adjustment blades form a light passage aperture of a polygonal shape not smaller than a hexagonal shape.

23. According to the embodiment, there is provided an image capturing apparatus including the light amount adjustment device.

The above-described embodiments are merely typical examples, and various changes and modifications can be made on the embodiments when practicing the present invention.

What is claimed is:
1. A light amount adjustment device comprising:
   a plurality of first light amount adjustment blades configured to move rectilinearly in a direction crossing a light passage direction; and
   a plurality of second light amount adjustment blades configured to pivot within a plane crossing the light passage direction, wherein the plurality of first light amount adjustment blades are arranged to face each other and move rectilinearly, wherein the plurality of second light amount adjustment blades include critical points and/or inflection points, and wherein, as a light passage aperture of a polygonal shape formed by annularly superposing the first light amount adjustment blades and the second light amount adjustment blades is enlarged, a shape of the light passage aperture is deformed so as to increase sides and/or corners of the shape of the light passage aperture by pivoting the plurality of second light amount adjustment blades so that the number of the critical points and/or inflection points included in an edge portion forming the light passage aperture is increased on two end sides of the light passage aperture in directions crossing a moving direction of the plurality of first light amount adjustment blades, and the shape of the light passage aperture comes close to a circular shape from a polygonal shape.

2. The light amount adjustment device according to claim 1, further comprising:

a housing configured to accommodate the plurality of first light amount adjustment blades and the plurality of second light amount adjustment blades, wherein at least one blade out of the plurality of first light amount adjustment blades and the plurality of second light amount adjustment blades is configured to partition an internal space of the housing and form a plurality of blade chambers, wherein a projecting portion configured to contact the at least one blade and assist movement of the at least one blade is provided on an inner wall of the housing.

3. The light amount adjustment device according to claim 1, wherein an arc portion is formed at the edge portion forming the light passage aperture by pivoting the plurality of second light amount adjustment blades in a direction in which the light passage aperture is enlarged.

4. The light amount adjustment device according to claim 1, wherein the plurality of first light amount adjustment blades include critical points and/or inflection points, and wherein, as the light passage aperture is enlarged, the shape of the light passage aperture is deformed so as to increase sides and/or corners of the shape of the light passage aperture by pivoting the plurality of second light amount adjustment blades and rectilinearly moving the plurality of first light amount adjustment blades so that the number of the critical points and/or inflection points included in the edge portion forming the light passage aperture is increased by the plurality of second light amount adjustment blades first and then the number of the critical points and/or inflection points included in the edge portion forming the light passage aperture is increased by the plurality of first light amount adjustment blades.

5. The light amount adjustment device according to claim 1, wherein as the light passage aperture is enlarged, the number of corners in the light passage aperture is increased by an even number.

6. The light amount adjustment device according to claim 1, further comprising a base member provided with a driving arm configured to drive the plurality of first light amount adjustment blades and the plurality of second light amount adjustment blades, wherein the base member includes an opening portion configured to transmit light, wherein the driving arm pivots about a shaft positioned apart from the opening portion, and wherein the base member includes rotation center shafts of the plurality of second light amount adjustment blades driven by the driving arm.

7. The light amount adjustment device according to claim 6, wherein the rotation center shafts communicate with rotation center holes provided in the plurality of second light amount adjustment blades.

8. The light amount adjustment device according to claim 1, wherein the light passage aperture including an arc portion is formed by at least one of the first light amount adjustment blades.

9. An optical device comprising a light amount adjustment device, the light amount adjustment device comprising:

a plurality of first light amount adjustment blades configured to move rectilinearly in a direction crossing a light passage direction; and a plurality of second light amount adjustment blades configured to pivot within a plane crossing the light passage direction, wherein the plurality of first light amount adjustment blades are arranged to face each other and move rectilinearly, wherein the plurality of second light amount adjustment blades include critical points and/or inflection points, and wherein, as a light passage aperture of a polygonal shape formed by annularly superposing the first light amount adjustment blades and the second light amount adjustment blades is enlarged, a shape of the light passage aperture is deformed so as to increase sides and/or corners of the shape of the light passage aperture by pivoting the plurality of second light amount adjustment blades so that the number of the critical points and/or inflection points included in an edge portion forming the light passage aperture is increased on two end sides of the light passage aperture in directions crossing a moving direction of the plurality of first light amount adjustment blades, and the shape of the light passage aperture comes close to a circular shape from a polygonal shape.

10. An apparatus comprising:

a plurality of first light amount adjustment blades configured to move rectilinearly in a direction crossing a light passage direction; and a plurality of second light amount adjustment blades configured to pivot within a plane crossing the light passage direction, wherein the plurality of first light amount adjustment blades are arranged to face each other and move rectilinearly, wherein the plurality of second light amount adjustment blades include critical points and/or inflection points, and wherein, as a light passage aperture of a polygonal shape formed by annularly superposing the first light amount adjustment blades and the second light amount adjustment blades is enlarged, a shape of the light passage aperture is deformed so as to increase sides and/or corners of the shape of the light passage aperture by pivoting the plurality of second light amount adjustment blades so that the number of the critical points and/or inflection points included in an edge portion forming the light passage aperture is increased on two end sides of the light passage aperture in directions crossing a moving direction of the plurality of first light amount adjustment blades.

* * * * *